(12) United States Patent
Nishino et al.

(10) Patent No.: US 11,171,548 B2
(45) Date of Patent: Nov. 9, 2021

(54) CONDUCTOR SHAPING APPARATUS AND METHOD

(71) Applicant: TOYOTA JIDOSHA KABUSHIKI KAISHA, Toyota (JP)

(72) Inventors: Junki Nishino, Toyota (JP); Hiromitsu Kuraoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 339 days.

(21) Appl. No.: 16/181,598

(22) Filed: Nov. 6, 2018

(65) Prior Publication Data
US 2019/0173362 A1    Jun. 6, 2019

(30) Foreign Application Priority Data

Dec. 1, 2017 (JP) .............................. JP2017-232115

(51) Int. Cl.
*H02K 15/00* (2006.01)
*H02K 3/52* (2006.01)
*H02K 15/04* (2006.01)

(52) U.S. Cl.
CPC ......... *H02K 15/0056* (2013.01); *H02K 3/522* (2013.01); *H02K 15/0037* (2013.01); *H02K 15/0062* (2013.01); *H02K 15/045* (2013.01); *H02K 2203/09* (2013.01)

(58) Field of Classification Search
CPC ............................. B21F 1/004; H05K 15/0428; H05K 15/0087; H02K 15/0428; H02K 15/0087; H02K 15/0056
See application file for complete search history.

(56) References Cited

U.S. PATENT DOCUMENTS

2003/0005579 A1* 1/2003 Takahashi .......... H02K 15/0428
29/732
2018/0375409 A1* 12/2018 Yoshida ............. H02K 15/0087

FOREIGN PATENT DOCUMENTS

| JP | 2013-240809 | 12/2013 |
| JP | 2017-93197 | 5/2017 |
| JP | 2018-19563 | 2/2018 |

* cited by examiner

Primary Examiner — Livius R. Cazan
(74) Attorney, Agent, or Firm — Oblon, McClelland, Maier & Neustadt, L.L.P.

(57) ABSTRACT

A conductor shaping apparatus rotates one of a first shaping die and a second shaping die about a rotational axis with respect to the other so as to format least one bent portion in a conductor. The conductor shaping apparatus includes a holding section that holds the conductor, a first drive source that applies driving force to the first shaping die and rotates the first shaping die about the rotational axis, a second drive source that applies driving force to the second shaping die and rotates the second shaping die about the rotational axis, and a controller that controls the first and second drive sources so as to rotate one of the first and second shaping dies about the rotational axis with respect to the other and controls the first and second drive sources so as to integrally rotate the first and second shaping dies about the rotational axis.

12 Claims, 16 Drawing Sheets

CONDUCTOR SHAPING APPARATUS AND METHOD

CROSS-REFERENCE TO RELATED APPLICATION

The present disclosure claims priority to Japanese Patent Application No. 2017-232115 filed on 1 Dec. 2017, which is incorporated herein by reference in its entirety including specification, drawings and claims.

TECHNICAL FIELD

The present disclosure relates to a conductor shaping apparatus and method to form a bent portion in a conductor.

BACKGROUND

A conventionally known conductor shaping apparatus includes a fixed die and a movable die that is rotated about a rotational axis (as shown in, for example, Patent Literature 1). The conductor shaping apparatus forms at least one first bent portion that is bent in a flatwise direction of a conductor, at least one second bent portion that is bent in an edgewise direction substantially orthogonal to the flatwise direction and a third bent portion that is bent in the edgewise direction near a distal end of the conductor. The fixed die of the conductor shaping apparatus includes a first shaping surface that is a curved surface extending about the rotational axis and has a shape corresponding to that of the first bent portion of the conductor, and at least one first edgewise bending portion that is formed near an end portion of the first shaping surface in a circumferential direction. The movable die includes a second shaping surface that includes a first position with a shape corresponding to that of the conductor before a shaping and a second position with a shape corresponding to that of the first bent portion of conductor and is formed such that the shape of the second shaping surface gradually changes from the first position to the second position along the circumferential direction about the rotational axis, and a second edgewise bending portion that is formed near the second position of the second shaping surface and presses the conductor in the circumferential direction about the rotational axis. Further, the conductor shaping apparatus includes a cam mechanism that includes a fixed cam follower that is fixed to an outer portion of the fixed die and a cam member that is rotatably supported by the fixed die and is rotated while contacting with the fixed cam follower. In the conductor shaping apparatus, the first bent portion is formed in the conductor by the first shaping surface of the fixed die and the second shaping surface of the movable die when the movable die is rotated in a first direction about the rotating axis with respect to the fixed die. Then, the second edgewise bending portion of the movable die presses the conductor against the first edgewise bending portion of the fixed die so as to form the second bent portion in the conductor when the movable die is further rotated in the first direction after the first bent portion is formed. The fixed dies is slightly rotated together with the movable die when the movable die is further rotated in the first direction after the second bent portion is formed, so that the cam member is rotated while contacting with the fixed cam follower so as to form the third bent portion in the conductor.

CITATION LIST

Patent Literature

PTL1: Japanese Patent Application Laid Open No. 2017-93197

Summary

The above conventional conductor shaping apparatus enables the first, second and third bent portions to be formed in the conductor by rotating the movable die in one direction. However, the conductor is pressed against a surface of the fixed die by the movable die and is pressed toward a downstream side in a rotational direction of the movable die when the movable die is rotated with respect to the fixed die. Thus, the conductor is slightly bent in the rotational direction, so that a shaping accuracy of the bent portions deteriorates. Further, flexibility of shaping the conductor is not always high in the above conductor shaping apparatus. Thus, the conductor may not be desirably formed depending on a shape of the conductor (orientations of the bent portions) to be obtained even though shapes of the fixed and movable dies are changed.

A subject matter of the disclosure is to provide conductor shaping apparatus and method capable of improving the accuracy and the flexibility of shaping the conductor with bent portions.

The disclosure is directed to a conductor shaping apparatus configured to rotate one of a first shaping die and a second shaping die about a rotational axis with respect to the other of the first and second shaping dies so as to form at least one bent portion in a conductor. The conductor shaping apparatus includes a holding section configured to hold the conductor, a first drive source configured to apply driving force to the first shaping die and to rotate the first shaping die about the rotational axis, a second drive source configured to apply driving force to the second shaping die and to rotate the second shaping die about the rotational axis, and a controller programmed to control the first and second drive sources so as to rotate one of the first and second shaping dies about the rotational axis with respect to the other of the first and second shaping dies, the controller programmed to control the first and second drive sources so as to integrally rotate the first and second shaping dies about the rotational axis.

The conductor shaping apparatus of the disclosure rotates one of the first and second shaping dies about the rotational axis with respect to the other of the first and second shaping dies, so that at least one bent portion is formed in the conductor held by the holding section. On this occasion, the first drive source applies driving force to the first shaping die and the second drive source applies driving force to the second shaping die so that the conductor is tightly clamped between the first and second shaping dies, thereby enabling the bent portion to be accurately formed in the conductor. Further, the conductor shaping apparatus integrally rotates the first and second shaping dies about the rotational axis, so that the bent portion is formed in the conductor held by the holding section. On this occasion, the first drive source applies driving force to the first shaping die and the second drive source applies driving force to the second shaping die so as to maintain a state where the conductor is tightly clamped between the first and second shaping dies, thereby enabling the bent portion to be accurately formed in the conductor. Furthermore, in the conductor shaping apparatus capable of integrally rotating the first and second shaping dies about the rotational axis, a rotational direction of the first and second shaping dies that are integrally rotated can be set in accordance with orientations of the bent portions to be formed in the conductor, thereby improving the flexibility of setting the orientations of the bent portions. As a result, the conductor shaping apparatus improves the accuracy and the flexibility of shaping the conductor with the bent portion.

The holding section may include a proximal end shaping portion configured to contact with the conductor so as to form the bent portion in a most proximal end side when the first and second shaping dies are integrally rotated about the rotational axis. That is, when the first and second shaping dies are integrally rotated about the rotational axis, the bent portion in the most proximal end side is accurately formed in the conductor by the proximal end shaping portion with a simple structure.

The conductor shaping apparatus may further include a distal end shaping portion configured to contact with a distal end portion of the conductor so as to form the bent portion when the first and second shaping dies are integrally rotated about the rotational axis. That is, when the first and second shaping dies are integrally rotated about the rotational axis, the bent portion is accurately formed in the distal end portion of the conductor by the distal end shaping portion with a simple structure.

The distal end shaping portion may be configured to contact with the distal end portion of the conductor in a downstream side of a position where the first and second shaping dies start rotating integrally in a rotational direction of the first and second shaping dies.

A rotational direction of the one of the first and second shaping dies with respect to the other of the first and second shaping dies may be the same as a rotational direction of the first and second shaping dies that are integrally rotated. This configuration enables a plurality of the bent portions to be formed in the conductor without stopping a rotation of the one of the first and second shaping dies, thereby reducing time required to form the plurality of the bent portions in the conductor.

A rotational direction of the one of the first and second shaping dies with respect to the other of the first and second shaping dies may be contrary to a rotational direction of the first and second shaping dies that are integrally rotated. This configuration enables a specific bent portion that is not formed by the conductor shaping apparatus in which the rotational direction of the one of the first and second shaping dies with respect to the other of the first and second shaping dies is the same as the rotational direction of the first and second shaping dies that are integrally rotated even though shapes of the first and second shaping dies are changed to be formed in the conductor.

The controller may be configured to control one of the first and second drive sources so as to generate a torque for stopping the one of the first and second shaping dies when controlling the other of the first and second drive sources so as to rotate the other of the first and second shaping dies with respect to the one of the first and second shaping dies. This configuration enables the conductor to be tightly clamped between the first and second shaping dies when forming the bent portion in the conductor while rotating the one of the first and second shaping dies with respect to the other of the first and second shaping dies, thereby accurately forming the bent portion in the conductor.

The controller may be configured to control the first and second drive sources so as to rotate the first and second shaping dies about the rotational axis at a same rotational speed when the first and second shaping dies are integrally rotated about the rotational axis. This configuration enables the conductor to be tightly clamped between the first and second shaping dies when forming the bent portion in the conductor while integrally rotating the first and second shaping dies, thereby accurately forming the bent portion in the conductor.

The controller may be configured to control the first and second drive sources so as to make a torque applied to one of the first and second shaping dies become equal to or larger than a torque applied to the other of the first and second shaping dies when the first and second shaping dies are integrally rotated about the rotational axis in a state where the one of the first and second shaping dies is positioned on a rear side in a rotational direction and the other of the first and second shaping dies is positioned on a front side in the rotational direction. In this conductor shaping apparatus, the conductor is tightly clamped between the first and second shaping dies when forming the bent portion in the conductor while integrally rotating the first and second shaping dies, so that the bent portion is accurately formed in the conductor.

The conductor may be a rectangular wire. The bent portion may include an edgewise bent portion and a flatwise bent portion. At least one of the edgewise bent portion and the flatwise bent portion may be formed in the conductor by rotating the one of the first and second shaping dies with respect to the other of the first and second shaping dies. At least one edgewise bent portion may be formed in the conductor by integrally rotating the first and second shaping dies about the rotational axis.

The conductor may be a bus bar portion that extends from one end of a coil. The holding section may be configured to hold the coil. That is, the conductor shaping apparatus according to the disclosure enables a plurality of bent portions to be accurately bent in desirable directions in the bus bar portion that extends from the one end of the coil.

Further, the disclosure is directed to a conductor shaping method of forming a plurality of bent portions in a conductor that is held by a holding section with a first shaping die and a second shaping die, the method comprising. The method includes forming the bent portion in the conductor by rotating one of the first and second shaping dies about the rotational axis with respect to the other of the first and second shaping dies, and forming the bent portion in the conductor by integrally rotating the first and second shaping dies about the rotational axis.

The method improves the accuracy and the flexibility of shaping the conductor with the bent portions.

DESCRIPTION OF EMBODIMENTS

The following describes some embodiments of the disclosure with reference to drawings.

Figure 1:
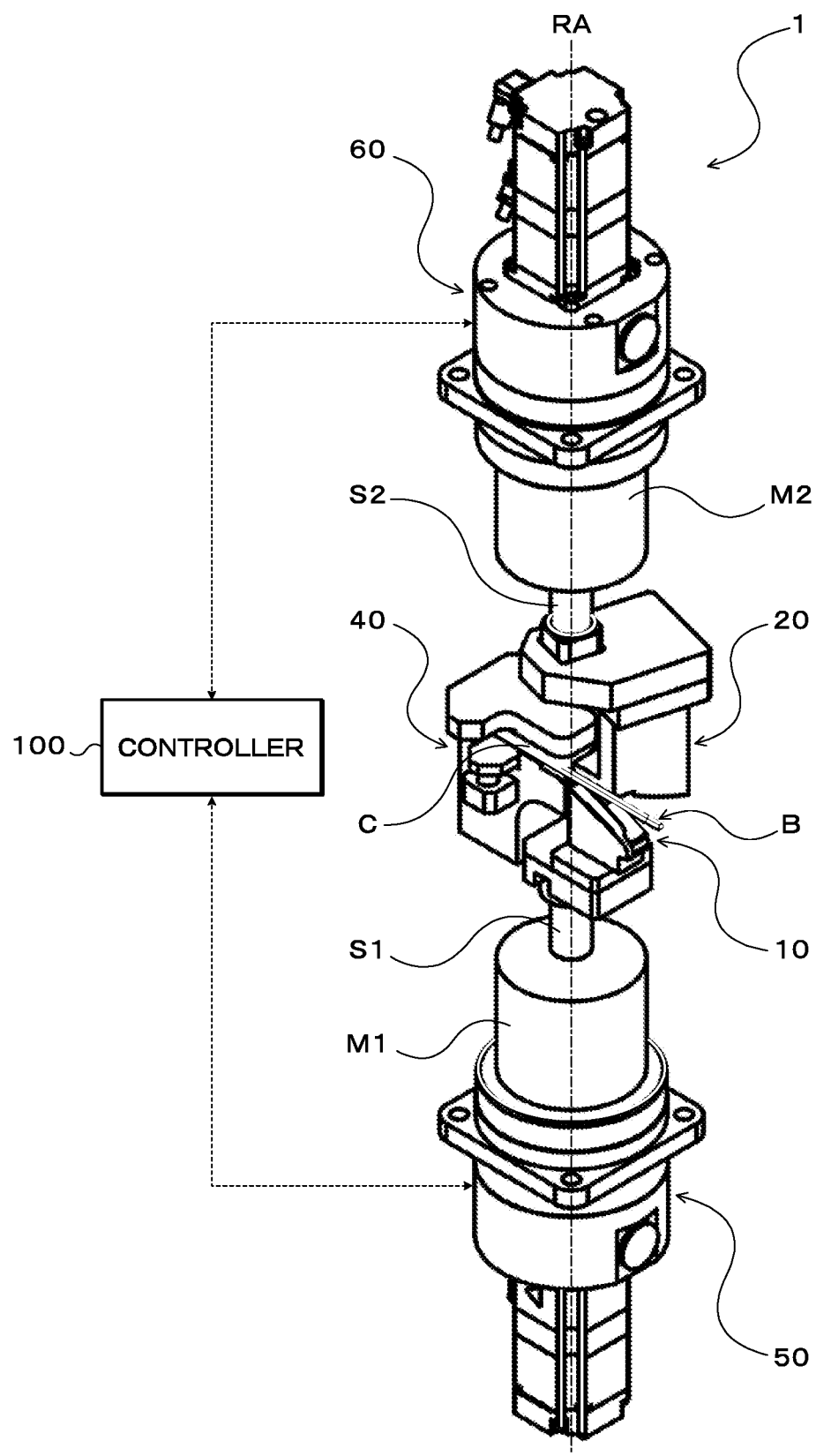
FIG. 1 is a schematic configuration diagram illustrating a conductor shaping apparatus according to the disclosure.

FIG. 1 is a schematic configuration diagram illustrating a conductor shaping apparatus 1 according to the disclosure. The conductor shaping apparatus 1 of FIG. 1 is configured to shape a long bus bar portion B that extends from one end of a coil C shown in FIG. 2. The coil C is a rectangular coil (cassette coil) of a concentrated winding type that is formed by winding one rectangular wire (conductor) in two layers and multi columns (for example 6-10 columns) while bending the rectangular wire in an edgewise direction. For example, the coil C is applied to a three-phase AC motor mounted on an electric vehicle, a hybrid vehicle or the like. The coil C has a substantially truncated square pyramid outer shape and includes a short lead portion (terminal portion) L that extends from the other end of the coil C. As shown in the figure, the bus bar portion B of the coil C extends in a direction apart from the lead portion L. The coil C is fitted to teeth of a stator core of the motor together with a plastic insulator, for example. The bus bar portion B is electrically connected (welded) to the lead portion L of the corresponding coil C. As a result, U phase, V phase and W phase stator coils are wound on the stator.

Figure 2:
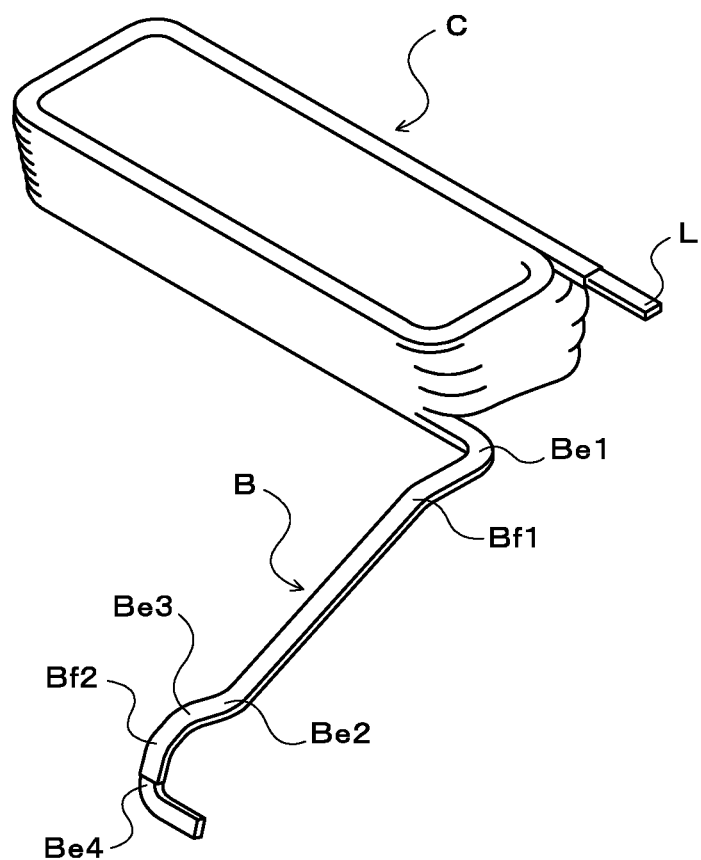
FIG. 2 is a perspective view illustrating a coil with a bus bar portion that is shaped by the conductor shaping apparatus of FIG. 1.

As shown in FIG. 2, the bus bar portion B of the coil C is configured to include a plurality of edgewise bent portions (first bent portions) Be1, Be2, Be3 and Be4 that are bent in the edgewise direction (first bent direction: a direction substantially orthogonal to short sides of a cross section of the rectangular wire) and a plurality of flatwise bent portions (second bent portions) Bf1 and Bf2 that are bent in a flatwise direction (second bent direction: a direction substantially orthogonal to long sides of the cross section of the rectangular wire). In the embodiment, the edgewise bent portion Be1 in a most proximal end side (root side) and the edgewise bent portion Be4 in a most distal end side are bent in opposite directions each other. The edgewise bent portions Be2 and Be3 between the edgewise bent portions Be1 and Be4 are bent in opposite directions each other. Further, the flatwise bent portion Bf1 is formed between the edgewise bent portions Be1 and Be2. The flatwise bent portion Bf2 is formed between the edgewise bent portions Be3 and Be4. The flatwise bent portions Bf1 and Bf2 are bent in a same direction each other.

The conductor shaping apparatus 1 is configured to include a first shaping die 10 and a second shaping die 20 to form the plurality of edgewise bent portions Be2, Be3 and the plurality of flatwise bent portions Bf1, Bf2 in the bus bar portion B of the coil C, a distal end shaping portion 30 (refer to FIG. 3) to form the edgewise bent portion Be4 in the distal end portion of the bus bar portion B, a coil holding section 40 configured to hold the coil C, a first driving device (first drive source) 50 with a drive shaft S1, a second driving device (second drive source) 60 with a drive shaft S2, and a controller 100 that controls the first and second driving devices 50, 60 and the coil holding section 40.

Figure 3:
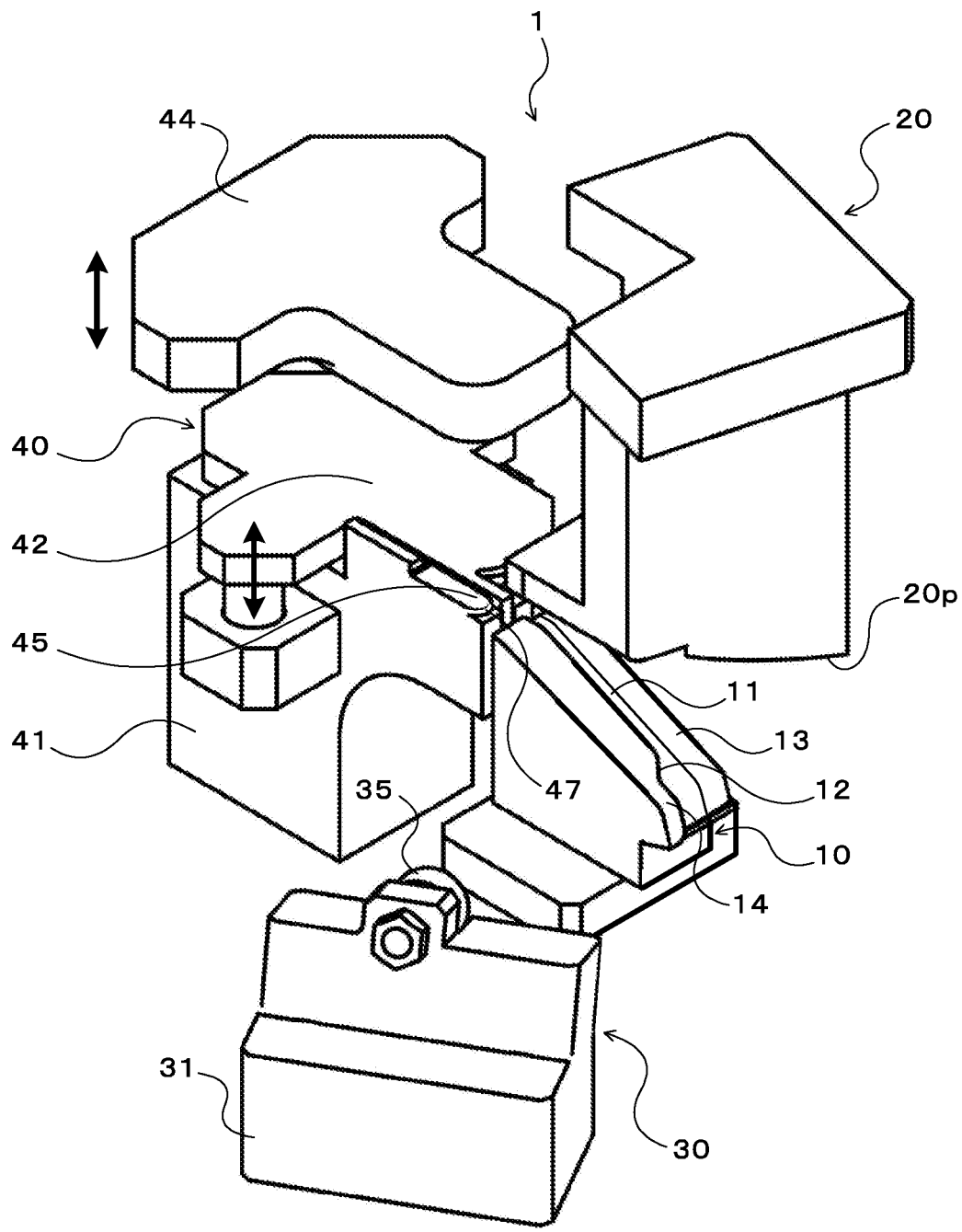
FIG. 3 is a perspective view illustrating the conductor shaping apparatus according to the disclosure.

As shown in FIGS. 1 and 3, the first shaping die 10 is a lower die including a die surface on an upper side in the figures. A distal end of the drive shaft S1 of the first driving device 50 is fixed to a lower surface in the figures (surface opposite to the die surface) of the first shaping die 10. The second shaping die 20 is an upper die including a die surface capable of covering the die surface of the first shaping die 10 on a lower side in the figures. A distal end of the drive shaft S2 of the second driving device 60 is fixed to an upper surface in the figures (surface opposite to the die surface) of the second shaping die 20. The distal end shaping portion 30 and the coil holding section 40 are fixed to an installation place of the conductor shaping apparatus 1. The first driving device 50 is disposed (fixed) below the first shaping die 10 in FIG. 1 such that the drive shaft S1 coaxially extends with a rotational axis RA that extends in a vertical direction of the installation place of the conductor shaping apparatus 1. The second driving device 60 is disposed (fixed) above the second shaping die 20 in FIG. 1 such that the drive shaft S2 coaxially extends with the rotational axis RA.

As shown in FIG. 3, the first shaping die 10 includes a first flatwise shaping surface 11 configured to form the flatwise bent portions Bf1 and Bf2 in the bus bar portion B of the coil C and a first edgewise shaping surface 12 configured to form the edgewise bent portions Be2 and Be3 in the bus bar portion B of the coil C as the die surface. The first flatwise shaping surface 11 of the first shaping die 10 includes a first curved surface (convex curved surface) corresponding to a lower surface in FIG. 2 of the flatwise bent portion Bf1 and a second curved surface (convex curved surface) corresponding to the lower surface in FIG. 2 of the flatwise bent portion Bf2. The first flatwise shaping surface 11 further includes a flat surface that is disposed on the rotational axis RA side of the first curved surface (upper side in FIG. 3) and corresponds to the lower surface in FIG. 2 of the bus bar portion B between the edgewise bent portion Be1 and the flatwise bent portion Bf1, a flat inclined surface that extends downward in FIG. 3 between the first and second curved surfaces and corresponds to the lower surface in FIG. 2 of the bus bar portion B between the flatwise bent portions Bf1 and Bf2, and a flat inclined surface that extends downward in FIG. 3 on an opposite side of rotational axis RA with respect to the second curved surface and corresponds to the lower surface in FIG. 2 of the bus bar portion B on the distal end side of the flatwise bent portion Bf2. In addition, a guide surface 13 is formed in an end portion of the first shaping die 10 near the second shaping die 20. The guide surface 13 is configured to include a conical surface that extends about the rotational axis RA and continues to the flat surface, the curved surfaces and the inclined surfaces of the first flatwise shaping surface 11, and the like.

The first edgewise shaping surface 12 of the first shaping die 10 forms a side surface of a stepped portion 14 that is formed in the first shaping die 10 and extends along an end portion of the first shaping die 10 far from the second shaping die 20. The stepped portion 14 protrudes upward in FIG. 3 from the first flatwise shaping surface 11. The first edgewise shaping surface 12 extends upward in the figure from an edge portion of the first flatwise shaping surface 11 and extends along the edge portion. The first edgewise shaping surface 12 includes a first curved surface (convex curved surface) corresponding to an outer side surface (inner side surface in FIG. 2: surface including the short side of the cross section of the rectangular wire) of the edgewise bent portion Be2 and a second curved surface (concave curved surface) corresponding to the outer side surface of the edgewise bent portion Be3. The first edgewise shaping surface 12 further includes a flat surface that is disposed on the rotational axis RA side of the first curved surface (upper side in FIG. 3) and corresponds to the outer side surface of the bus bar portion B between the edgewise bent portions Be1 and Be2, a flat surface that extends between the first and second curved surfaces and corresponds to the outer side surface of the bus bar portion B between the edgewise bent portions Be2 and Be3, and a flat surface that is disposed in the opposite side of the rotational axis RA with respect to the second curved surface and corresponds to the outer side surface of the bus bar portion B on the distal end side of the edgewise bent portion Be3.

The second shaping die 20 includes a pressing surface 20p that extends from an end portion near the first shaping die 10 toward an opposite end portion, a second flatwise shaping surface (not shown) configured to form the flatwise bent portions Bf1 and Bf2 in the bus bar portion B of the coil C, and a second edgewise shaping surface 22 (refer to FIG. 5) configured to form the edgewise bent portions Be2 and Be3 in the bus bar portion B of the coil C. The pressing surface 20p has a substantially circular sector planar shape that extends about the rotational axis RA. The pressing surface 20p is formed such that a surface shape thereof gradually changes about the rotational axis RA from a distal end portion having a shape corresponding to that of the bus bar portion B that extends straight before shaping to an end portion on the second flatwise shaping surface side that has a shape corresponding to that of the bus bar portion B after shaping.

The second flatwise shaping surface of the second shaping die 20 continues to the pressing surface 20p and includes a first curved surface (concave curved surface) corresponding to an upper surface in FIG. 2 of the flatwise bent portion Bf1 and a second curved surface (concave curved surface) corresponding to the upper surface in FIG. 2 of the flatwise bent portion Bf2. The second flatwise shaping surface further includes a flat surface that is disposed on the rotational axis RA side of the first curved surface and corresponds to the upper surface in FIG. 2 of the bus bar portion B between the edgewise bent portion Be1 and the flatwise bent portion Bf1, a flat inclined surface that extends downward in FIG. 3 between the first and second curved surfaces and corresponds to the upper surface in FIG. 2 of the bus bar portion B between the flatwise bent portions Bf1 and Bf2, and a flat inclined surface that extends downward in FIG. 3 on the opposite side of rotational axis RA with respect to the second curved surface and corresponds to the upper surface in FIG. 2 of the bus bar portion B on the distal end side of the flatwise bent portion Bf2.

The second edgewise shaping surface 22 of the second shaping die 20 forms a side surface of a stepped portion (not shown) that is formed in the second shaping die 20 so as to extend along an end portion far from the first shaping die 10. The stepped portion protrudes downward in FIG. 3 from the second flatwise shaping surface. The second edgewise shaping surface 22 extends downward in the figure from an edge portion of the second flatwise shaping surface and extends along the edge portion. The second edgewise shaping surface 22 includes a first curved surface (concave curved surface) corresponding to an inner side surface (front side surface in FIG. 2) of the edgewise bent portion Be2 and a second curved surface (convex curved surface) corresponding to the inner side surface of the edgewise bent portion Be3. The second edgewise shaping surface 22 further includes a flat surface that is disposed on the rotational axis RA side of the first curved surface and corresponds to the inner side surface of the bus bar portion B between the edgewise bent portions Be1 and Be2, a flat surface that extends between the first and second curved surfaces and corresponds to the inner side surface of the bus bar portion B between the edgewise bent portions Be2 and Be3, and a flat surface that is disposed in the opposite side of the rotational axis RA with respect to the second curved surface and corresponds to the inner side surface of the bus bar portion B on the distal end side of the edgewise bent portion Be3.

As shown in FIG. 3, the distal end shaping portion 30 includes a supporting block 31 that is fixed to the installation place of the conductor shaping apparatus 1 and a shaping roller 35 that is rotatably supported by the supporting block 31. The supporting block 31 is disposed on a downstream side in a rotational direction of the first shaping die 10 that is rotated from an initial position (stop position) thereof so as to be separated from the second shaping die 20 remaining at an initial position thereof. The supporting block 31 is disposed such that the shaping roller 35 faces the first shaping die 10.

As shown FIG. 3, the coil holding section 40 includes a supporting base 41 that is fixed to the installation place of the conductor shaping apparatus 1, a coil placing table 42 that is vertically movably supported by the supporting base 41, and a coil pressing plate 44 that is vertically movably supported by the supporting base 41. When the coil C conveyed by a coil conveyor (not shown) is placed on the coil placing table 42 of the coil holding section 40, the coil placing table 42 is lowered by a driving mechanism (not shown) and the coil pressing plate 44 is lowered by the driving mechanism so as to contact with the coil C. As a result, the coil C is securely held (clamped) by the coil holding section 40. When a shaping of the coil C by the conductor shaping apparatus 1 is completed, the coil placing table 42 is raised by the driving mechanism and the coil pressing plate 44 is raised by the driving mechanism so as to be separated from the coil C. This operation enables the coil C to be transferred from the coil placing table 42 to the coil conveyor after shaping the coil C.

Further, the coil holding section 40 includes a proximal end shaping portion 45 configured to form the edgewise bent portion Be1 in the most proximal end side of the bus bar portion B. The proximal end shaping portion 45 is formed in the coil supporting base 41 such that a side surface thereof contacts with the outer side surface of the bus bar portion B of the coil C on the lowered coil placing table 42. In addition, an edgewise shaping surface 47 is formed in a distal end portion (end portion near the first shaping die 10) of the proximal end shaping portion 45. The edgewise shaping surface 47 is a curved surface (cylindrical curved surface) corresponding to the edgewise bent portion Be1.

The first driving device 50 includes a motor M1 that is controlled by the controller 100 so as to apply a rotational torque (driving force) to the drive shaft S1. The first driving device 50 drives and rotates the drive shaft S1 by the motor M1 so as to rotate (turn) the first shaping die 10 about the rotational axis RA in normal and reverse directions. The second driving device 60 includes a motor M2 that is controlled by the controller 100 so as to apply a rotational torque (driving force) to the drive shaft S2. The second driving device 60 drives and rotates the drive shaft S2 by the motor M2 so as to rotate (turn) the second shaping die 20 about the rotational axis RA in normal and reverse directions.

The controller 100 of the conductor shaping apparatus 1 includes a computer with a CPU, ROM, RAM and the like, driving circuits for the motor M1 of the first driving device 50 and the motor M2 of the second driving device 60, a control circuit for the driving mechanism of the coil holding section 40, and the like. The controller 100 acquires a signal from a rotational sensor (not shown) that is included in the first driving device 50 and detects a rotational position of either the rotational shaft of the motor M1 or the drive shaft S1, a signal from a rotational sensor (not shown) that is included in the second driving device 60 and detects a rotational position of either the rotational shaft of the motor M2 or the drive shaft S2, and the like.

Further, in the controller 100, hardware such as the CPU, driving circuits and the like and previously installed programs cooperate to form a control module for the first driving device 50, a control module for the second driving device 60, a control module for the coil holding section 40, and the like as functional blocks. The control module for the first driving device 50 is programmed to control the motor M1 so that the drive shaft S1 is rotated at a desired rotational speed in a desired rotational direction (rotational speed control). Further, the control module for the first driving device 50 is programmed to control the motor M1 so that a desired rotational torque is applied to the drive shaft S1 (torque control). Similarly, the control module for the second driving device 60 is programmed to control the motor M2 so that the drive shaft S2 is rotated at a desired rotational speed in a desired rotational direction (rotational speed control). Further, the control module for the second driving device 60 is programmed to control the motor M2 so that a desired rotational torque is applied to the drive shaft S2 (torque control). The control module for the coil holding section 40 is programmed to control the driving mechanism (not shown) in accordance with progress of shaping the bus bar portion B by the conductor shaping apparatus 1 so as to vertically move the coil placing table 42 and the coil pressing plate 44.

The following describes a conductor shaping method according to the disclosure, or a shaping procedure of the bus bar portion B of the coil C by the above conductor shaping apparatus 1.

At a start of shaping of the bus bar portion B by the conductor shaping apparatus 1, the controller 100 moves the first and second shaping dies 10 and 20 to respective initial positions shown in FIG. 3 so that the second shaping die 20 is separated from the first shaping die 10. Further, the controller 100 controls the driving mechanism of the coil holding section 40 so as to raise the coil placing table 42 and the coil pressing plate 44 to respective initial positions shown in FIG. 3. The coil conveyor conveys the coil C that is wound by a coil winder and includes the unshaped bus bar portion B to the coil holding section 40 and places the coil C on the coil placing table 42.

Figure 4:
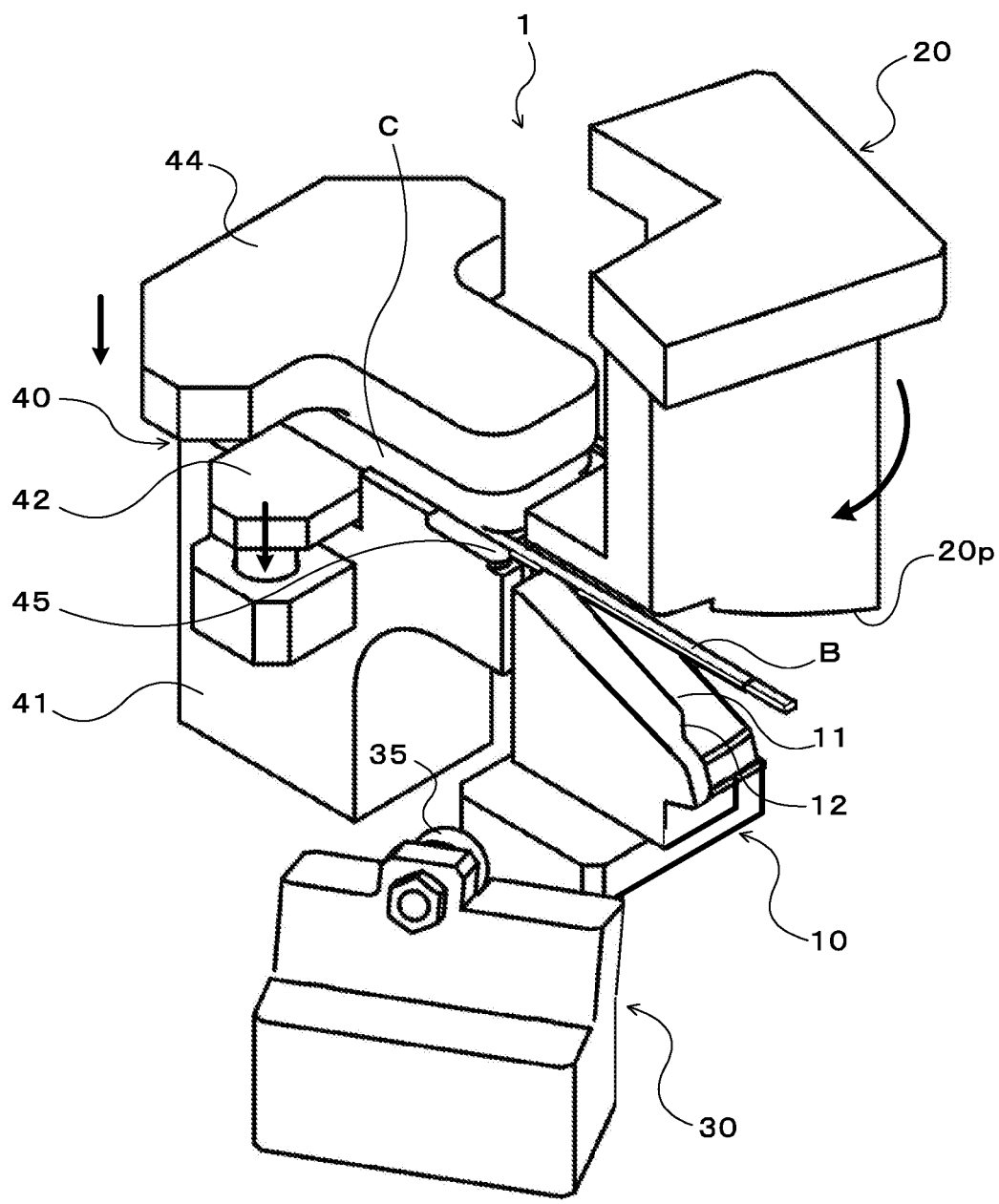
FIG. 4 is a perspective view illustrating an operation of the conductor shaping apparatus according to the disclosure.

When the coil C is placed on the coil placing table 42, the controller 100 controls the driving mechanism of the coil holding section 40 so that the coil placing table 42 is lowered and the coil pressing plate 44 contacts with the coil C as shown in FIG. 4. As a result, the coil C is securely held (clamped) by the coil holding section 40. When the coil placing table 42 is lowered, as shown in FIG. 4, the bus bar portion B of the coil C extends straight and a portion of the lower surface (surface including the long side of the cross section of the rectangular wire) of the bus bar portion B contacts with the flat surface in the most upper side of the first flatwise shaping surface 11 of the first shaping die 10. The outer side surface of the bus bar portion B contacts with both the side surface of the proximal end shaping portion 45 of the coil holding section 40 and a portion of the first edgewise shaping surface 12 of the first shaping die 10.

Then, the controller 100 controls the motor M2 of the second driving device 60 so as to rotate the second shaping die 20 with respect to the first shaping die 10 in a clockwise direction in FIG. 4 by a predetermined angle θ1 about the rotational axis RA. The angle θ1 is defined in consideration of springback of the bus bar portion B (rectangular wire) such that a space between the first edgewise shaping surface 12 of the first shaping die 10 and the second edgewise shaping surface 22 of the second shaping die 20 becomes substantially the same as a width of the bus bar portion B when the second shaping die 20 is rotated by the angle θ1 from the initial position.

The second shaping die 20 that is rotated about the rotational axis RA gradually approaches the first shaping die 10, so that the bus bar portion B of the coil C held by the coil holding section 40 is gradually pressed downward in FIG. 4 in the flatwise direction by the pressing surface 20p of the second shaping die 20. Further, according to an increase in a rotational angle of the second shaping die 20, the bus bar portion B is clamped between the first flatwise shaping surface 11 of the first shaping die 10 and the second flatwise shaping surface of the second shaping die 20. When the rotational angle of the second shaping die 20 becomes larger, the bus bar portion B is pressed against the second flatwise shaping surface by the first flatwise shaping surface 11 and is clamped between the first edgewise shaping surface 12 of the first shaping die 10 and the second edgewise shaping surface 22 of the second shaping die 20.

Figure 5:
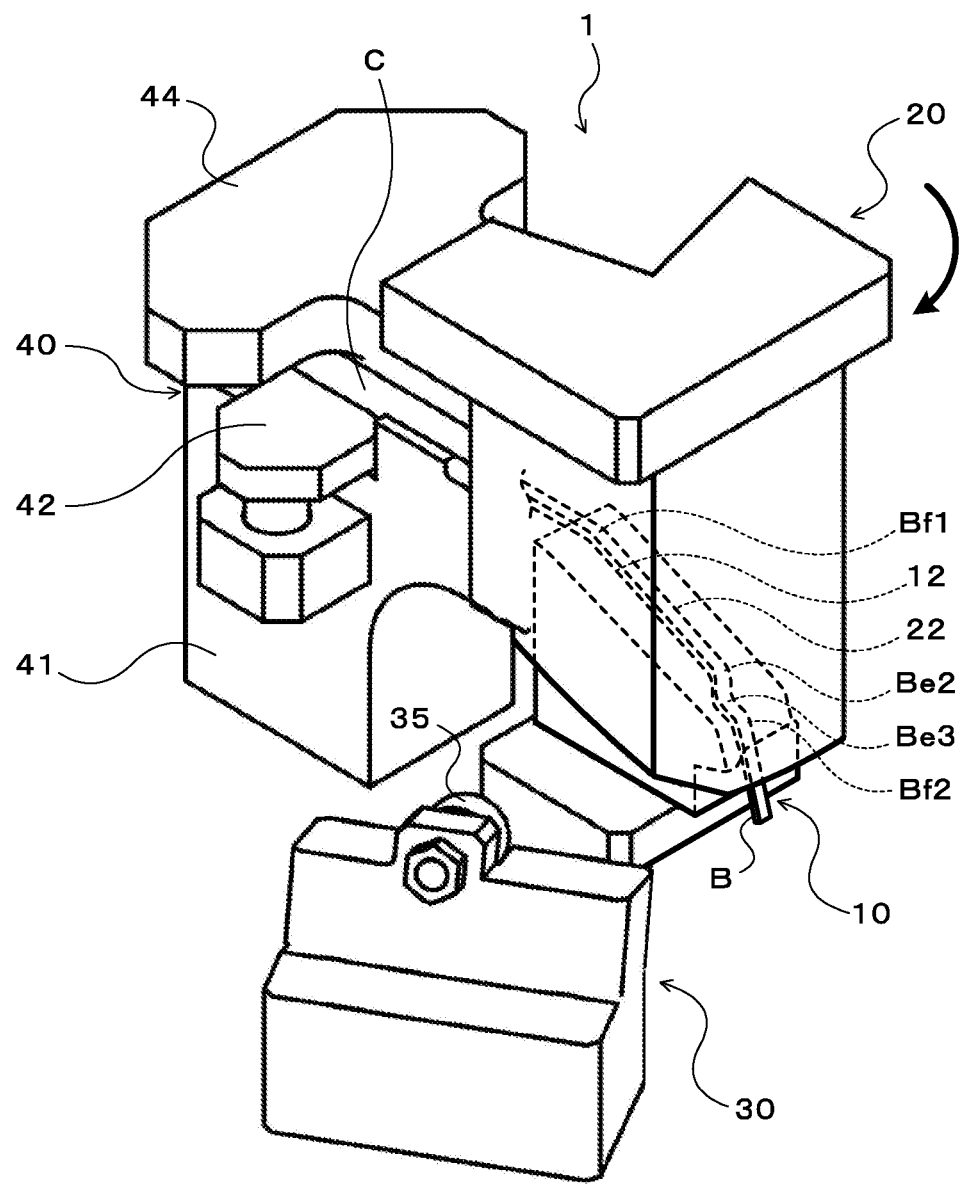
FIG. 5 is a perspective view illustrating the operation of the conductor shaping apparatus according to the disclosure.

As a result, the edgewise bent portions Be2, Be3 and the flatwise bent portions Bf1, Bf2 are formed in the bus bar portion B as shown in FIG. 5 when the second shaping die 20 is rotated with respect to the first shaping die 10 by the predetermined angle θ1 about the rotational axis RA. As shown in FIG. 5, the distal end portion of the bus bar portion B protrudes outward via a clearance between the first and second shaping dies 10 and 20 when the second shaping die 20 is rotated by the predetermined angle θ1 about the rotational axis RA.

In the embodiment, the controller 100 controls the motor M2 of the driving device 60 so that the drive shaft S2 is rotated at a predetermined rotational speed until a predetermined time elapses after a start of the rotation of the second shaping die 20 (rotational speed control). For example, the predetermined time is predetermined as a time until a portion of the bus bar portion B pressed by the pressing surface 20p of the second shaping die 20 contacts with the first edgewise shaping surface 12 of the first shaping die 10 after the start of the rotation of the second shaping die 20. The rotational speed control of the motor M2 while the bus bar portion B is pressed by the pressing surface 20p of the second shaping die 20 satisfactorily reduces a time required to form the edgewise bent portions Be2, Be3 and the flatwise bent portions Bf1, Bf2 in the bus bar portion B.

When the above predetermined time has elapsed after the start of the rotation of the second shaping die 20, the controller 100 controls the motor M2 of the second driving device 60 so as to apply a predetermined rotational torque to the drive shaft S2 (torque control). Simultaneously with the torque control of the motor M2, the controller 100 controls the motor M1 of the first driving device 50 so as to output a torque for stopping the first shaping die 10 at the initial position to the drive shaft S1. As a result, the bus bar portion B is tightly clamped between the first and second shaping dies 10 and 20 when shaping the bus bar portion B while rotating the second shaping die 20 with respect to the first shaping die 10, thereby accurately forming the edgewise bent portions Be2, Be3 and the flatwise bent portions Bf1, Bf2.

When the rotational angle of the second shaping die 20 becomes the angle θ1, the controller 100 controls the motors M1 and M2 of the first and second driving devices 50 and 60 so that the first and second shaping dies 10 and 20 are integrally rotated about the rotational axis RA in the clockwise direction in FIG. 5 by a predetermined angle θ2 therefrom. In the embodiment, the rotational direction of the first and second shaping dies 10 and 20 that are integrally rotated is the same as the rotational direction of the second shaping die 20 with respect to the first shaping die 10 when shaping the bus bar portion B. On this occasion, the controller 100 controls the motors M1 and M2 of the first and second driving devices 50 and 60 so as to rotate the first and second shaping dies 10 and 20 about the rotational axis RA at a same rotational speed.

Figure 6:
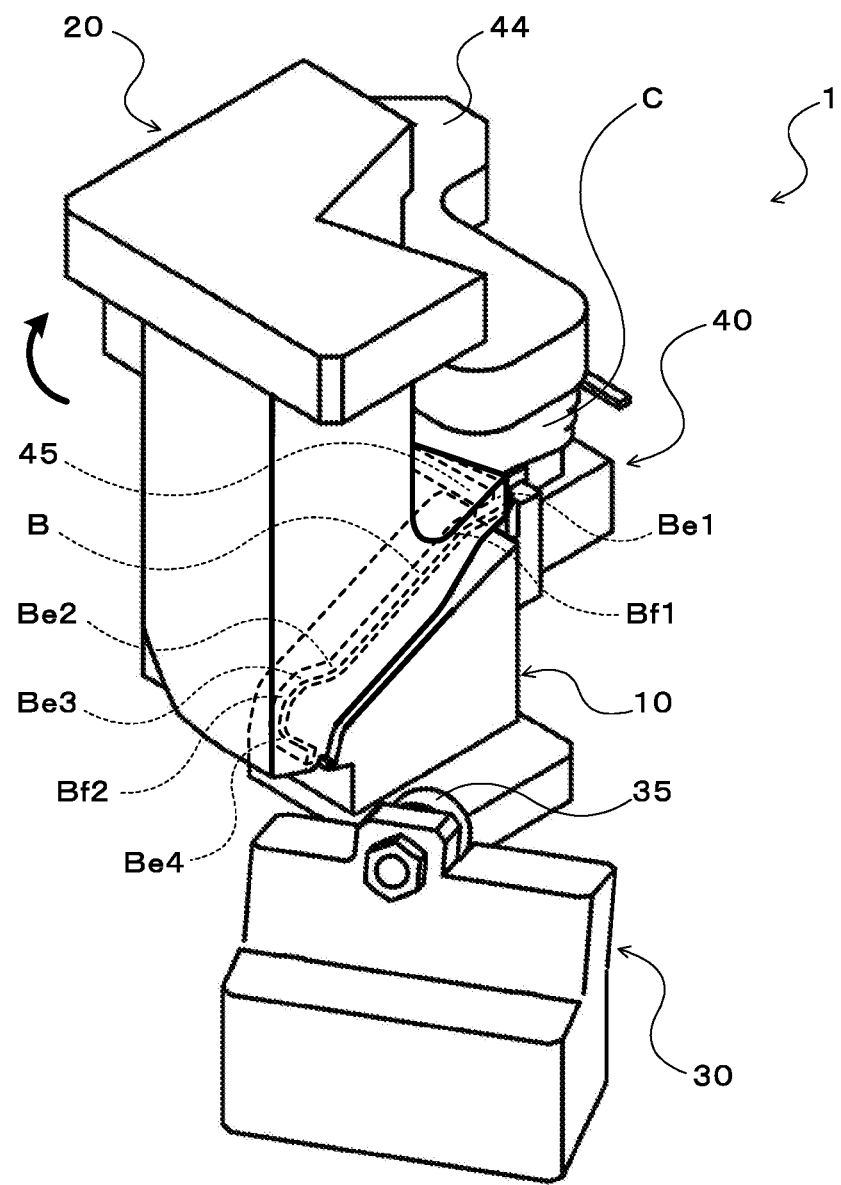
FIG. 6 is a perspective view illustrating the operation of the conductor shaping apparatus according to the disclosure.

When the first and second shaping dies 10 and 20 are integrally rotated, a portion of the bus bar portion B between the portion (proximal end) of the bus bar portion B restrained by the proximal end shaping portion 45 of the coil holding section 40 and the portion of the bus bar portion B clamped between the first and second shaping dies 10 and 20 (the first and second edgewise shaping surfaces 12 and 22) is pressed against the edgewise shaping surface 47 of the proximal end shaping portion 45 so as to be bent in the edgewise direction. As a result, as shown in FIG. 6, the edgewise bent portion Be1 in the most proximal end side is formed in the bus bar portion B by integrally rotating the first and second shaping dies 10 and 20 about the rotational axis RA by the angle θ2. On this occasion, the bus bar portion B is tightly clamped between the first and second shaping dies 10 and 20 that are rotated about the rotational axis RA at the same rotational speed, so that the edgewise bent portion Be1 in the most proximal end side is accurately formed in the bus bar portion B.

Further, when the first and second shaping dies 10 and 20 are integrally rotated, the outer side surface (left side surface in FIG. 5) of the distal end portion of the bus bar portion B that protrudes outward via the clearance between the first and second shaping dies 10 and 20 contacts with the shaping roller 35 of the distal end shaping portion 30 on a downstream side of the initial position of the first shaping die 10 (where the first and second shaping dies 10 and 20 start rotating integrally) in the rotational direction of the first and second shaping dies 10 and 20. In response to the rotation of the first and second shaping dies 10 and 20, the shaping roller 35 rolls on the outer side surface of the distal end portion of the bus bar portion B that is rotated while being held by the first and second shaping dies 10 and 20 (the first and second edgewise shaping surfaces 12 and 22). The distal end portion of the bus bar portion B is pressed by the shaping roller 35 to be bent in a direction opposite to the rotational direction of the first and second shaping dies 10 and 20. That is, the distal end portion of the bus bar portion B is bent in the edgewise direction so as to extend in a direction opposite to an extending direction of the edgewise bent portion Be1 in the most proximal end side.

As a result, as shown in FIG. 6, the edgewise bent portion Be4 in the most distal end side is formed in the bus bar portion B by integrally rotating the first and second shaping dies 10 and 20 about the rotational axis RA by the angle θ2. On this occasion, the bus bar portion B is tightly clamped between the first and second shaping dies 10 and 20 that are rotated about the rotational axis RA at the same rotational speed, so that the edgewise bent portion Be4 in the most distal end side is accurately formed in the bus bar portion B. Further, the shaping roller 35 forms the edgewise bent portion Be4 while rolling on the outer side surface of the distal end portion of the bus bar portion B, thereby reducing small scratches on the bus bar portion B. The angle θ2 for integrally rotating the first and second shaping dies 10 and 20 is defined in consideration of bent angles of the edgewise bent portions Be1 and Be4 and springback of the bus bar portion B (rectangular wire).

Figure 7:
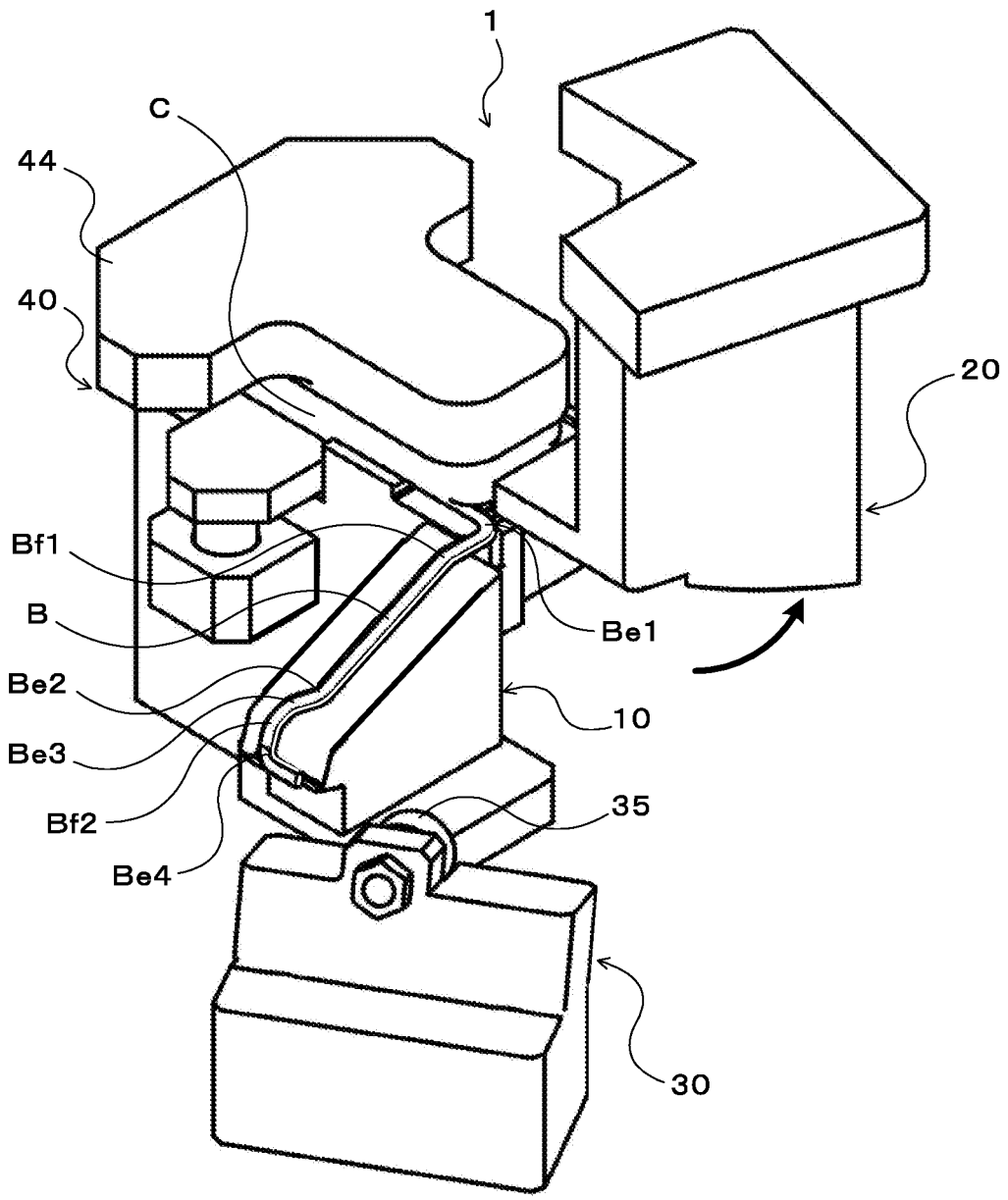
FIG. 7 is a perspective view illustrating the operation of the conductor shaping apparatus according to the disclosure.
Figure 8:
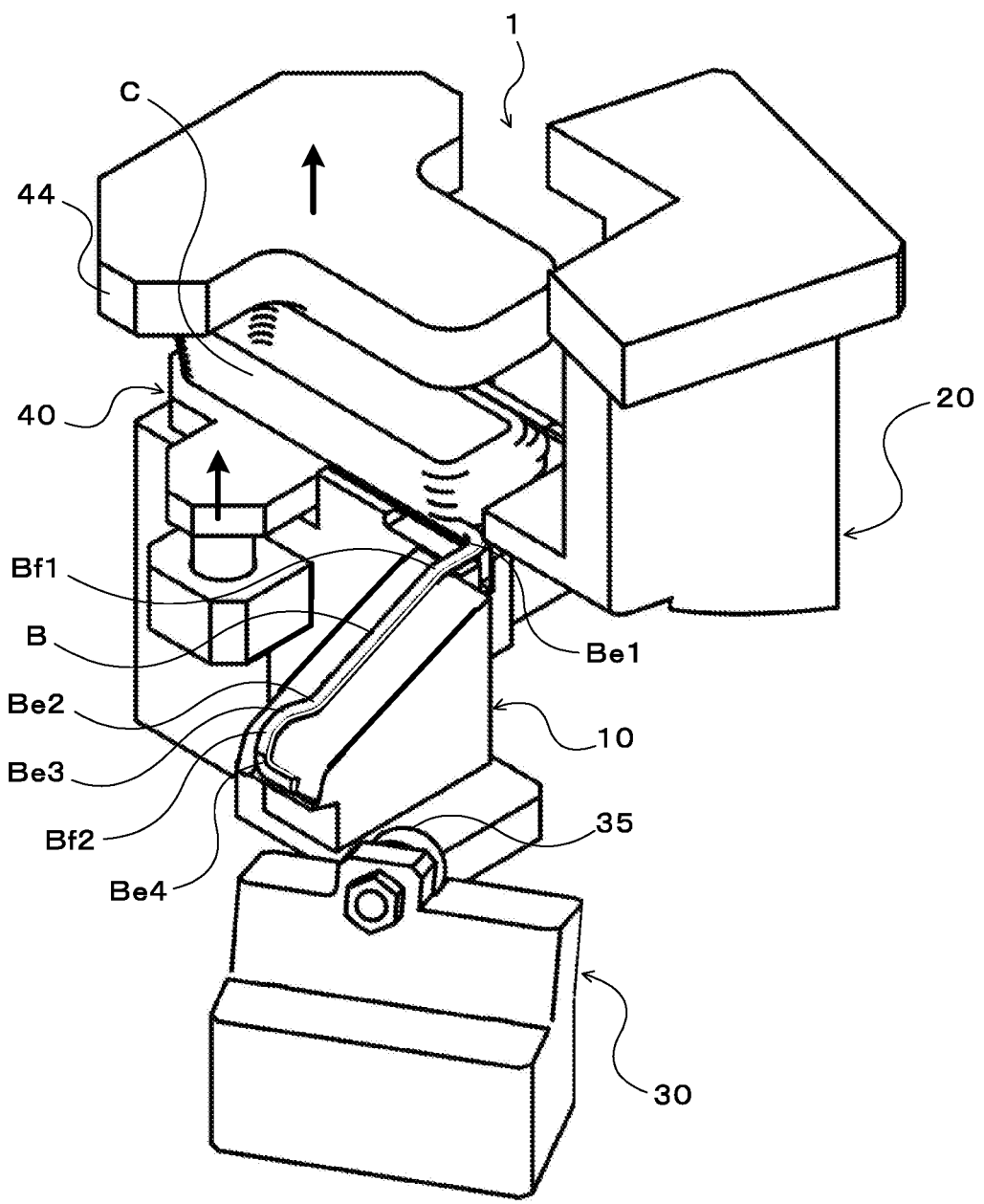
FIG. 8 is a perspective view illustrating the operation of the conductor shaping apparatus according to the disclosure.

When the rotational angle of the first and second shaping dies 10 and 20 becomes the angle θ2 and the edgewise bent portions Be1 and Be4 are formed completely, the controller 100 stops the motors M1 and M2 of the first and second driving devices 50 and 60 so as to stop the rotation of the first and second shaping dies 10 and 20. Then, the controller 100 controls the motor M2 of the second driving device 60 so that the second shaping die 20 is rotated about the rotational axis RA and returns to the initial position. On this occasion, the controller 100 controls the motor M2 of the second driving device 60 so that the drive shaft S2 is rotated at a predetermined rotational speed (rotational speed control). When the second shaping die 20 returns to the initial position as shown in FIG. 7, the controller 100 controls the driving mechanism of the coil holding section 40 so as to raise the coil placing table 42 and the coil pressing plate 44 to respective initial positions shown in FIG. 3. Thus, as shown in FIG. 8, the coil pressing plate 44 is separated from the coil C and the coil C is raised together with the coil placing table 42. Then, the coil C with the shaped bus bar portion B is transferred to the coil conveyor (not shown). After that, the plurality of edgewise bent portions Be1-Be4 and the plurality of flatwise bent portions Bf1 and Bf2 are formed in the bus bar portion B by the conductor shaping apparatus 1 when the coil C with the unshaped bus bar portion B is placed on the coil placing table 42.

As has been described above, the conductor shaping apparatus 1 rotates the second shaping die 20 about the rotational axis RA with respect to the first shaping die 10, so that the edgewise bent portions Be2, Be3 and the flatwise bent portions Bf1, Bf2 are formed in the bus bar portion B of the coil C held by the coil holding section 40. On this occasion, the second driving device 60 applies the rotational torque (driving force) to the second shaping die 20 and the first driving device 50 applies the rotational torque (driving force) to the first shaping die 10 so that the bus bar portion B is tightly clamped between the first and second shaping dies 10 and 20, thereby enabling the bent portions Be2, Be3, Bf1 and Bf2 to be accurately formed in the bus bar portion B.

Further, the conductor shaping apparatus 1 rotates the first and second shaping dies 10 and 20 integrally about the rotational axis RA, so that the edgewise bent portions Be1 and Be4 are formed in the bus bar portion B of the coil C held by the coil holding section 40. On this occasion, the first driving device 50 applies the rotational torque to the first shaping die 10 and the second driving device 60 applies the rotational torque to the second shaping die 20 so as to maintain a state where the bus bar portion B is tightly clamped between the first and second shaping dies 10 and 20, so that the edgewise bent portions Be1 and Be4 are accurately formed in the bus bar portion B.

Furthermore, in the conductor shaping apparatus 1 capable of integrally rotating the first and second shaping dies 10 and 20 about the rotational axis RA, the rotational direction of the first and second shaping dies 10 and 20 that are integrally rotated can be set in accordance with orientations of the edgewise bent portions to be formed in the bus bar portion B, thereby improving the flexibility of setting the orientations of the edgewise bent portions. As a result, the conductor shaping apparatus 1 improves the accuracy and the flexibility of shaping the bus bar portion B with the plurality of bent portions Be1-Be4, Bf1 and Bf2.

The conductor shaping apparatus 1 includes the proximal end shaping portion 45 configured to contact with the bus bar portion B so as to form the edgewise bent portion Be1 in the most proximal end side when the first and second shaping dies 10 and 20 are integrally rotated about the rotational axis RA and the distal end shaping portion 30 configured to contact with the distal end portion of the bus bar portion B so as to form the edgewise bent portion Be4 when the first and second shaping dies 10 and 20 are integrally rotated about the rotational axis RA. That is, the edgewise bent portion Be1 in the most proximal end side and the edgewise bent portion Be4 in the most distal end side are accurately formed in the bus bar portion B by the proximal end shaping portion 45 with a simple structure and the distal end shaping portion 30 with a simple structure without using shaping sections including a movable section such as a cam mechanism or a dedicated driving device when integrally rotating the first and second shaping dies 10 and 20 about the rotational axis RA.

In the conductor shaping apparatus 1, the rotational direction of the second shaping die 20 with respect to the first shaping die 10 when shaping the bus bar portion B is the same as the rotational direction of the first and second shaping dies 10 and 20 that are integrally rotated. This configuration enables the integral rotation of the first and second shaping dies 10 and 20 to be started in midstream of shaping without stopping the rotation of the second shaping die 20 so as to form the plurality of the bent portions Be1-Be4, Bf1 and Bf2 in the bus bar portion B. Accordingly, time required to form the plurality of the bent portions Be1-Be4, Bf1 and Bf2 is reduced. However, the rotation of the motor M2 of the second driving device 60 or the rotation of the second shaping die 20 may be once stopped when the second shaping die 20 is rotated about the rotational axis RA by the predetermined angle θ1 with respect to the first shaping die 10.

In the conductor shaping apparatus 1, the controller 100 controls the motor M1 of the first driving device 50 so as to generate the torque for stopping the first shaping die 10 at the initial position when rotating the second shaping die 20 with respect to the first shaping die 10. This configuration enables the bus bar portion B to be tightly clamped between the first and second shaping dies 10 and 20 when forming the bent portions Be2, Be3, Bf1 and Bf2 in the bus bar portion B while rotating the second shaping die 20 with respect to the first shaping die 10, thereby accurately forming the edgewise bent portions Be2, Be3 and the flatwise bent portions Bf1, Bf2 in the bus bar portion B.

In the conductor shaping apparatus 1, the controller 100 controls the motors M1 and M2 of the first and second driving devices 50 and 60 so as to rotate the first and second shaping dies 10 and 20 about the rotational axis RA at the same rotational speed when the first and second shaping dies 10 and 20 are integrally rotated about the rotational axis RA. This configuration enables the bus bar portion B to be tightly clamped between the first and second shaping dies 10 and 20 when forming the edgewise bent portions Be1 and Be4 in the bus bar portion B while integrally rotating the first and second shaping dies 10 and 20, thereby accurately forming the edgewise bent portions Be1 and Be4 in the bus bar portion B.

In the conductor shaping apparatus 1, the controller 100 may be configured to control the motors M1 and M2 of the first and second driving devices 50 and 60 so as to make the torque applied to the second shaping die 20 on a rear side in the rotational direction become equal to or larger than the torque applied to the first shaping die 10 on a front side in the rotational direction when the first and second shaping dies 10 and 20 are integrally rotated about the rotational axis RA. In this configuration, the bus bar portion B is tightly clamped between the first and second shaping dies 10 and 20 when forming the edgewise bent portions Be1 and Be4 in the bus bar portion B while integrally rotating the first and second shaping dies 10 and 20, so that the edgewise bent portions Be1 and Be4 are accurately formed in the bus bar portion B.

Figure 9:
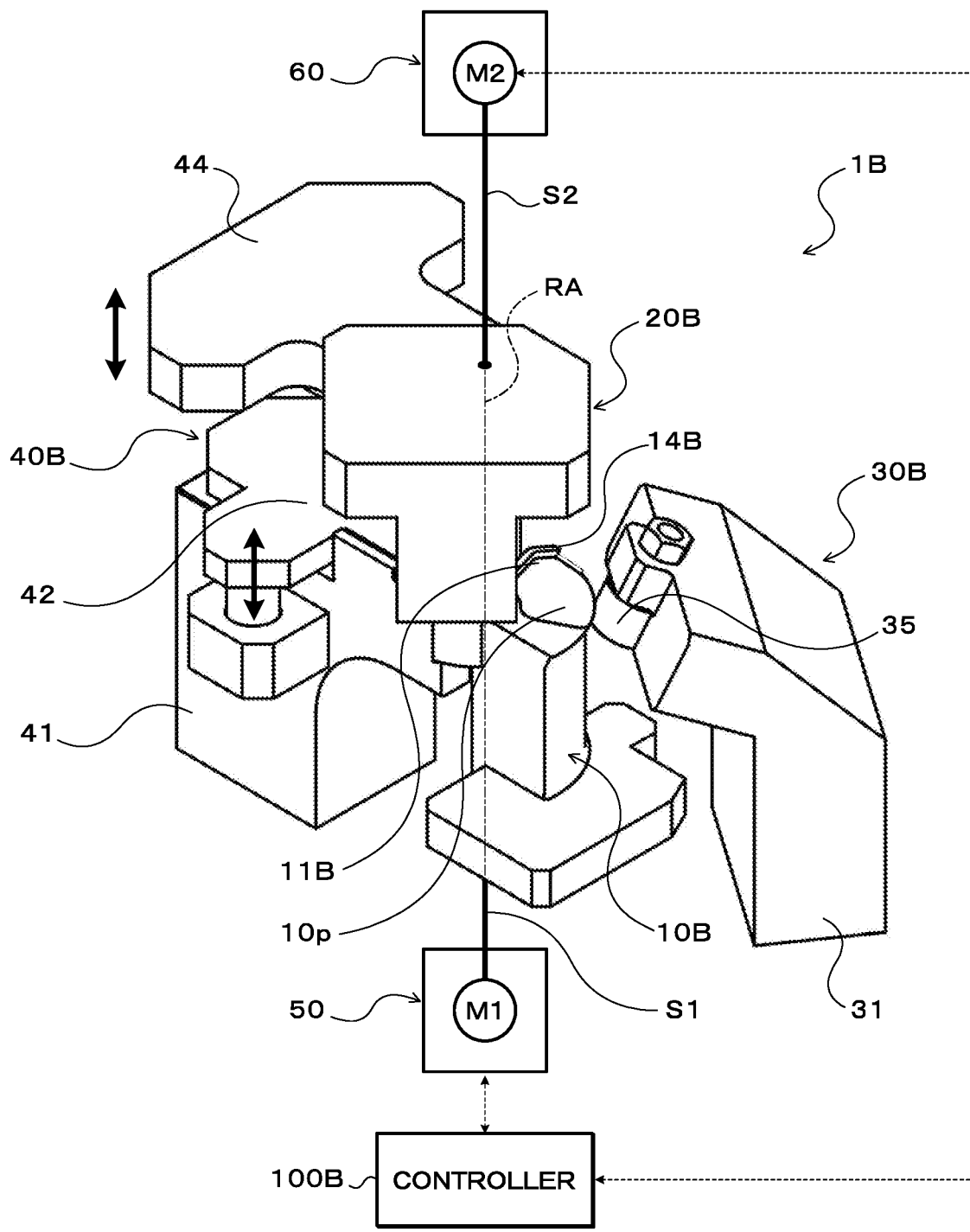
FIG. 9 is a perspective view illustrating another conductor shaping apparatus according to the disclosure.

FIG. 9 is a perspective view illustrating another conductor shaping apparatus 1B according to the disclosure. Among the components of the conductor shaping apparatus 1B, the same components to those of the conductor shaping apparatus 1 described above are expressed by the same reference signs and their repeated description is omitted.

Figure 10:
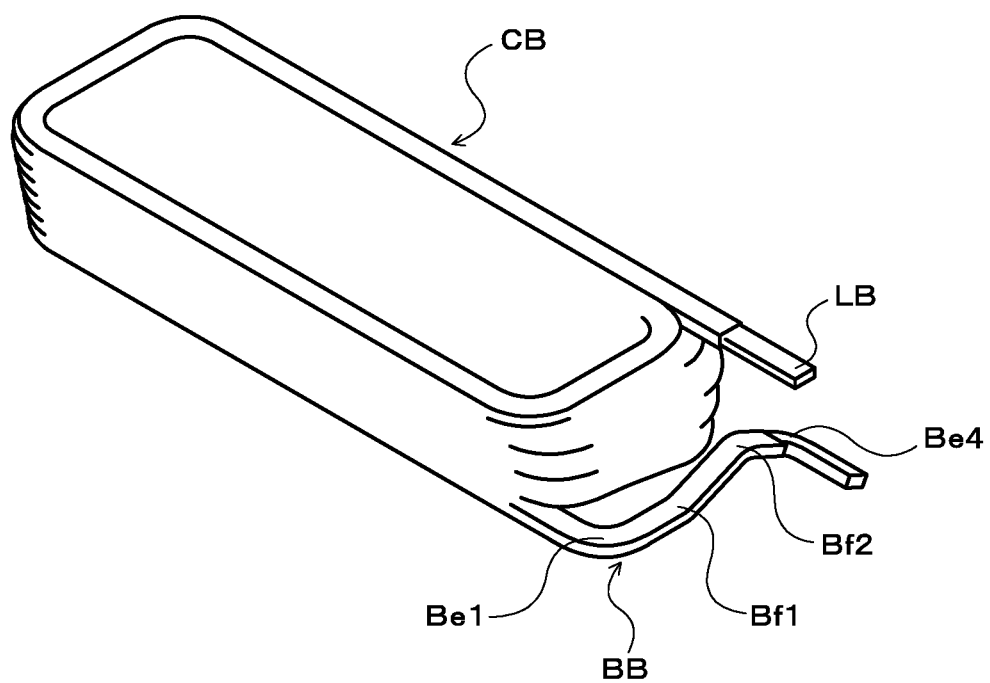
FIG. 10 is a perspective view illustrating a coil with a bus bar portion that is shaped by the conductor shaping apparatus of FIG. 9.

The conductor shaping apparatus 1B illustrated in FIG. 9 is configured to shape a bus bar portion BB that extends from one end of a coil CB shown in FIG. 10. The coil CB is the rectangular coil (cassette coil) of the concentrated winding type that is formed by winding one rectangular wire (conductor) in two layers and multi columns (for example 6-10 columns) while bending the rectangular wire in the edgewise direction. A short lead portion (terminal portion) LB extends from the other end of the coil CB. As shown in the figure, the bus bar portion BB extends in a direction approaching the lead portion LB.

As shown in FIG. 10, the bus bar portion BB of the coil CB is configured to include the plurality of edgewise bent portions Be1 and Be4 that are bent in the edgewise direction and the plurality of flatwise bent portions Bf1 and Bf2 that are bent in the flatwise direction. In the embodiment, the edgewise bent portion Be1 in the most proximal end side (root side) of the bus bar portion BB and the edgewise bent portion Be4 in the most distal end side are bent in opposite directions each other. The edgewise bent portion Be1 of the coil CB is bent in an opposite direction to the edgewise bent portion Be1 of the above coil C. The edgewise bent portion Be4 of the coil CB is bent in an opposite direction to the edgewise bent portion Be4 of the above coil C. The flatwise bent portions Bf1 and Bf2 are formed between the edgewise bent portions Be1 and Be4 and are bent in opposite directions each other.

As shown in FIG. 9, the conductor shaping apparatus 1B is configured to include a first shaping die (lower die) 10B and a second shaping die (upper die) 20B to form the plurality of flatwise bent portions Bf1 and Bf2 in the bus bar portion BB of the coil CB, a distal end shaping portion 30B to form the edgewise bent portion Be4 in the distal end portion of the bus bar portion BB, a coil holding section 40B configured to hold the coil CB, the first driving device (first drive source) 50 with the drive shaft S1, the second driving device (second drive source) 60 with the drive shaft S2, and a controller 100B that controls the first and second driving devices 50, 60 and the coil holding section 40B. The conductor shaping apparatus 1B for shaping the bus bar portion BB of the above coil CB is equivalent to the conductor shaping apparatus 1 in which the first and second shaping dies 10 and 20, the distal end shaping portion 30 and the coil holding section 40 are replaced with the first and second shaping dies 10B and 20B, the distal end shaping portion 30B and the coil holding section 40B that are respectively adapted to the coil CB.

As shown in FIG. 9, the distal end of the drive shaft S1 of the first driving device 50 is fixed to a lower surface in the figure (surface opposite to the die surface). The distal end of the drive shaft S2 of the second driving device 60 is fixed to an upper surface in the figure (surface opposite to the die surface). The first driving device 50 is disposed (fixed) below the first shaping die 10B in the figure such that the drive shaft S1 coaxially extends with the rotational axis RA. The second driving device 60 is disposed (fixed) above the second shaping die 20B in the figure such that the drive shaft S2 coaxially extends with the rotational axis RA. The first driving device 50 drives and rotates the drive shaft S1 by the motor M1 so as to rotate (turn) the first shaping die 10B about the rotational axis RA in normal and reverse directions. The second driving device 60 drives and rotates the drive shaft S2 by the motor M2 so as to rotate (turn) the second shaping die 20B about the rotational axis RA in normal and reverse directions.

The first shaping die 10B includes a pressing surface 10*p* that extends from an end portion near the second shaping die 20B to an opposite end portion, a first flatwise shaping surface 11B configured to form the flatwise bent portions Bf1 and Bf2 in the bus bar portion BB of the coil CB and a stepped portion 14B that is formed in the first shaping die 10B so as to extend along the end portion far from the second shaping die 20B. The pressing surface 10*p* has a substantially circular sector planar shape that extends about the rotational axis RA. The pressing surface 10*p* is formed such that a surface shape thereof gradually changes about the rotational axis RA from a distal end portion to an end portion on the first flatwise shaping surface 11B side.

The first flatwise shaping surface 11B of the first shaping die 10B continues to the pressing surface 10*p* and includes a first curved surface (concave curved surface) corresponding to a lower surface in FIG. 10 of the flatwise bent portion Bf1 of the bus bar portion BB and a second curved surface (convex curved surface) corresponding to the lower surface in FIG. 10 of the flatwise bent portion Bf2 of the bus bar portion BB. The first flatwise shaping surface 11B further includes a flat surface that is disposed on the rotational axis RA side of the first curved surface and corresponds to the lower surface in FIG. 10 of the bus bar portion BB between the edgewise bent portion Be1 and the flatwise bent portion Bf1, a flat inclined surface that extends upward in FIG. 9 between the first and second curved surfaces and corresponds to the lower surface in FIG. 10 of the bus bar portion BB between the flatwise bent portions Bf1 and Bf2, and a flat inclined surface that extends downward in FIG. 9 on an opposite side of rotational axis RA with respect to the second curved surface and corresponds to the lower surface in FIG. 10 of the bus bar portion BB on the distal end side of the flatwise bent portion Bf2. Aside surface of the stepped portion 14B of the first shaping die 10B on the second shaping die 20B side is a flat surface that extend in a radial direction of the first shaping die 10B.

The second shaping die 20B includes a second flatwise shaping surface (not shown) configured to form the flatwise bent portions Bf1 and Bf2 in the bus bar portion BB of the coil CB as the die surface. The second flatwise shaping surface of the second shaping die 20B includes a first curved surface (convex curved surface) corresponding to an upper surface in FIG. 10 of the flatwise bent portion Bf1 and a second curved surface (concave curved surface) corresponding to the upper surface in FIG. 10 of the flatwise bent portion Bf2. The second flatwise shaping surface further includes a flat surface that is disposed on the rotational axis RA side of the first curved surface and corresponds to the upper surface in FIG. 10 of the bus bar portion BB between the edgewise bent portion Be1 and the flatwise bent portion Bf1, a flat inclined surface that extends upward in FIG. 9 between the first and second curved surfaces and corresponds to the upper surface in FIG. 10 of the bus bar portion BB between the flatwise bent portions Bf1 and Bf2, and a flat inclined surface that extends downward in FIG. 9 on the opposite side of rotational axis RA with respect to the second curved surface and corresponds to the upper surface in FIG. 10 of the bus bar portion BB on the distal end side of the flatwise bent portion Bf2.

In addition, a guide surface (not shown) is formed in an end portion of the second shaping die 20B near the first shaping die 10B. The guide surface is configured to include a conical surface that extends about the rotational axis RA and continues to the flat surfaces, the curved surfaces and the inclined surfaces of the second flatwise shaping surface, and the like. Further, a stepped portion is formed in an end portion of the second shaping die 20B far from the first shaping die 10B so as to protrude downward in FIG. 9 from the second flatwise shaping surface and to extend along the second flatwise shaping surface. A side surface of the stepped portion on the first shaping die 10B side is a flat surface that extend in a radial direction of the second shaping die 20B.

As shown in FIG. 9, the distal end shaping portion 30B includes the supporting block 31 that is fixed to the installation place of the conductor shaping apparatus 1B and the shaping roller 35 that is rotatably supported by the supporting block 31. The supporting block 31 is disposed on a downstream side in a rotational direction of the first shaping die 10B that is rotated from an initial position (stop position) thereof so as to approach the second shaping die 20B. The supporting block 31 is disposed such that the shaping roller 35 faces the first shaping die 10B.

As shown in FIG. 9, the coil holding section 40B includes the supporting base 41 that is fixed to the installation place of the conductor shaping apparatus 1B, the coil placing table 42 that is vertically movably supported by the supporting base 41, and the coil pressing plate 44 that is vertically movably supported by the supporting base 41. Further, the coil holding section 40B includes a proximal end shaping portion 45B configured to form the edgewise bent portion Be1 in the most proximal end side of the bus bar portion BB (refer to FIGS. 14-16). The proximal end shaping portion 45B is formed in the coil supporting base 41 such that a side surface thereof contacts with an inner side surface (surface on the lead portion LB side) of the bus bar portion BB of the coil CB on the lowered coil placing table 42. In addition, an edgewise shaping surface is formed in a distal end portion (end portion near the first shaping die 10B) of the proximal end shaping portion 45B. The edgewise shaping surface is a curved surface (cylindrical curved surface) corresponding to the edgewise bent portion Be1.

The controller 100B of the conductor shaping apparatus 1B includes the computer with the CPU, ROM, RAM and the like, driving circuits for the motor M1 of the first driving device 50 and the motor M2 of the second driving device 60, a driving circuit for the driving mechanism of the coil holding section 40B, and the like. In the controller 100B, hardware such as the CPU, driving circuits and the like and previously installed programs cooperate to form the control module for the first driving device 50, the control module for the second driving device 60, the control module for the coil holding section 40B, and the like as functional blocks.

The following describes another conductor shaping method according to the disclosure, or a shaping procedure of the bus bar portion BB of the coil CB by the above conductor shaping apparatus 1B.

At a start of shaping of the bus bar portion BB by the above conductor shaping apparatus 1B, the controller 100B moves the first and second shaping dies 10B and 20B to respective initial positions shown in FIG. 9 so that the first and second shaping dies 10B and 20B are separated from each other. Further, the controller 100B controls the driving mechanism of the coil holding section 40B so as to raise the coil placing table 42 and the coil pressing plate 44 to respective initial positions shown in FIG. 9. The coil conveyor conveys the coil CB that is wound by a coil winder and includes the unshaped bus bar portion BB to the coil holding section 40B and places the coil CB on the coil placing table 42.

Figure 11:
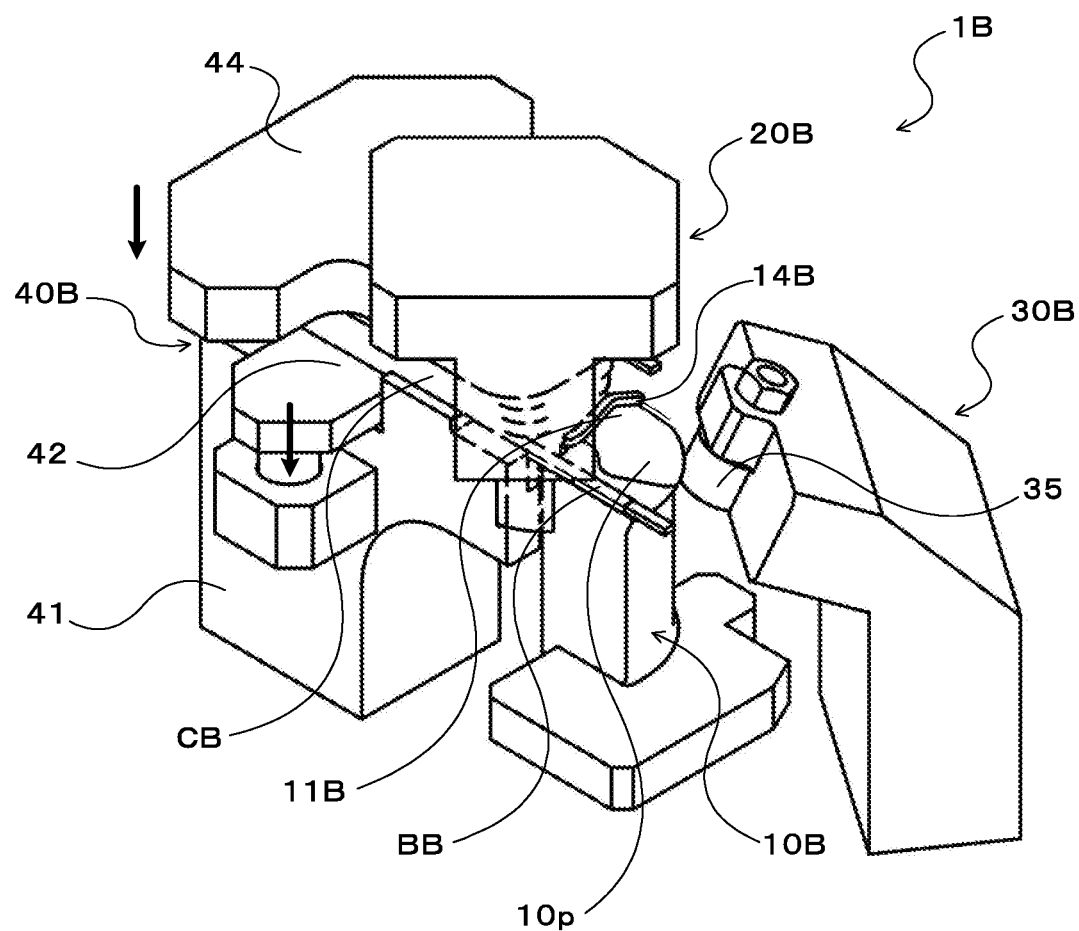
FIG. 11 is a perspective view illustrating an operation of another conductor shaping apparatus according to the disclosure.

When the coil CB is placed on the coil placing table 42, the controller 100B controls the driving mechanism of the coil holding section 40B so that the coil placing table 42 is lowered and the coil pressing plate 44 contacts with the coil CB as shown in FIG. 11. As a result, the coil CB is securely held (clamped) by the coil holding section 40B and the bus bar portion BB of the coil CB extends straight. Further, the inner side surface (the surface on the lead portion LB side) of the bus bar portion BB contacts with the side surface of the proximal end shaping portion 45B of the coil holding section 40B.

Figure 12:
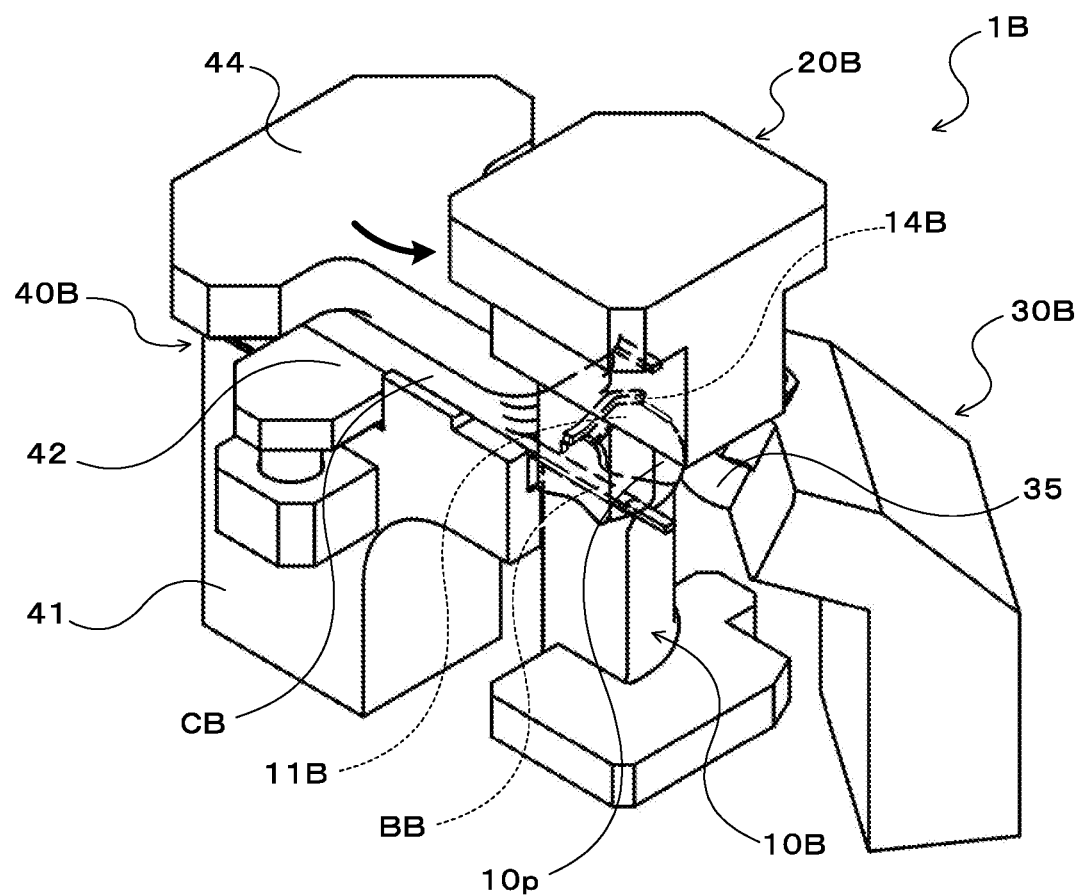
FIG. 12 is a perspective view illustrating the operation of another conductor shaping apparatus according to the disclosure.

Then, as shown in FIG. 12, the controller 100B controls the motor M2 of the second driving device 60 so as to rotate the second shaping die 20B up to a position where the guide surface of the second shaping die 20B is opposed to the upper surface in the figure of the bus bar portion BB of the coil CB (stop position of the second shaping die 20B when shaping the bus bar portion BB) about the rotational axis RA in a counterclockwise direction in the figure. Further, the controller 100B controls the motor M1 of the first driving device 50 so as to rotate the first shaping die 10B with respect to the second shaping die 20B in a clockwise direction in the figure by a predetermined angle θ3 about the rotational axis RA. The angle θ3 is defined such that a space between the side surface of the stepped portion 14B of the first shaping die 10B and the side surface of the above stepped portion of the second shaping die 20B becomes substantially the same as a width of the bus bar portion BB when the first shaping die 10B is rotated by the angle θ3 from the initial position.

Figure 13:
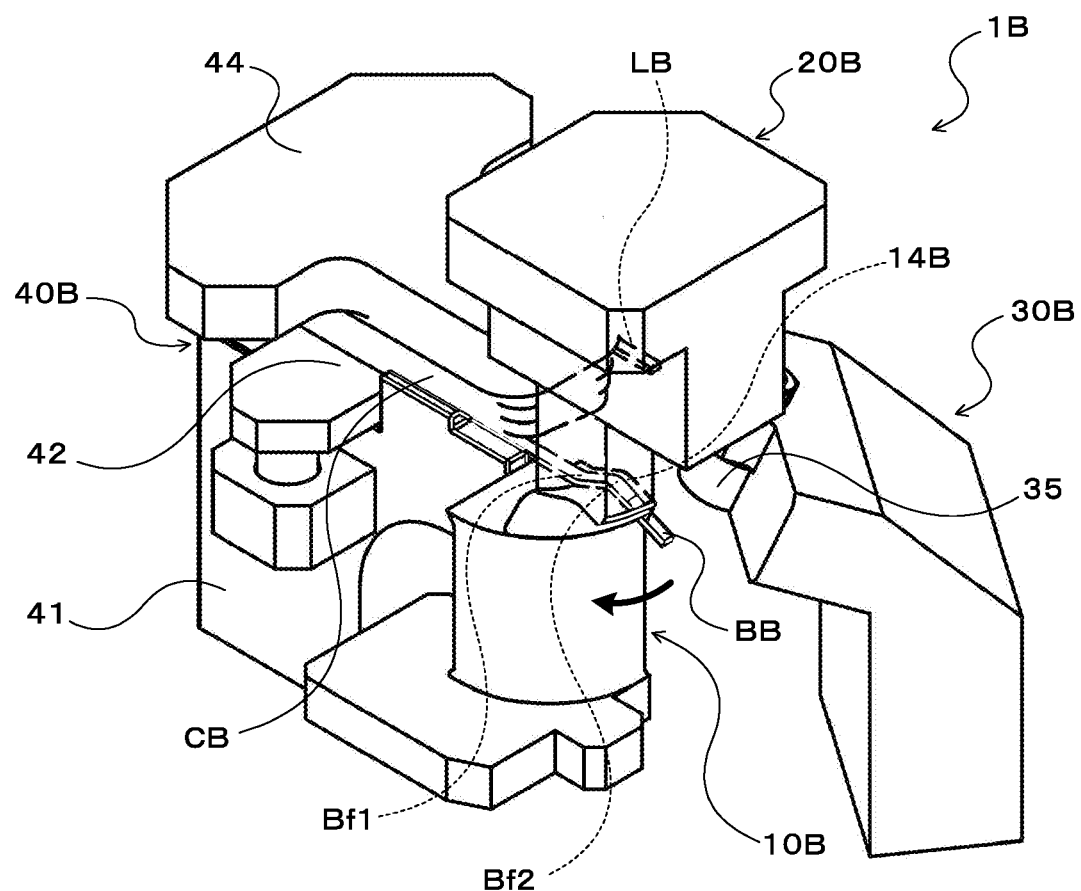
FIG. 13 is a perspective view illustrating the operation of another conductor shaping apparatus according to the disclosure.

The first shaping die 10B that is rotated about the rotational axis RA gradually approaches the second shaping die 20B, so that the bus bar portion BB of the coil CB held by the coil holding section 40B is gradually pressed upward in FIG. 12 in the flatwise direction by the pressing surface 10p of the first shaping die 10B. Further, according to an increase in a rotational angle of the first shaping die 10B, the bus bar portion BB is clamped between the first flatwise shaping surface 11B of the first shaping die 10B and the second flatwise shaping surface of the second shaping die 20B. As a result, the flatwise bent portions Bf1 and Bf2 are formed in the bus bar portion BB as shown in FIG. 13 when the first shaping die 10B is rotated with respect to the second shaping die 20B by the predetermined angle θ3 about the rotational axis RA. As shown in FIG. 13, the distal end portion of the bus bar portion BB protrudes outward via a clearance between the first and second shaping dies 10B and 20B when the first shaping die 10B is rotated by the predetermined angle θ3 about the rotational axis RA.

In the conductor shaping apparatus 1B, the controller 100B controls the motor M1 of the driving device 50 so that the drive shaft S1 is rotated at a predetermined rotational speed until a predetermined time elapses after a start of the rotation of the first shaping die 10B (rotational speed control). For example, the predetermined time is predetermined as a time until a portion of the bus bar portion BB pressed by the pressing surface 10p of the first shaping die 10B contacts with the first flatwise shaping surface 11B of the first shaping die 10B after the start of the rotation of the first shaping die 10B. The rotational speed control of the motor M1 while the bus bar portion BB is pressed by the pressing surface 10p satisfactorily reduces a time required to form the flatwise bent portions Bf1 and Bf2 in the bus bar portion BB.

When the above predetermined time has elapsed after the start of the rotation of the first shaping die 10B, the controller 100B controls the motor M1 of the first driving device 50 so as to apply a predetermined rotational torque to the drive shaft S1 (torque control). Further, the controller 100B controls the motor M2 of the second driving device 60 so as to output a rotational torque for stopping the second shaping die 20B at the above stop position when shaping the bus bar portion BB to the drive shaft S2. As a result, the bus bar portion BB is tightly clamped between the first and second shaping dies 10B and 20B when shaping the bus bar portion BB while rotating the first shaping die 10B with respect to the second shaping die 20B, so that the flatwise bent portions Bf1 and Bf2 are accurately formed.

When the rotational angle of the first shaping die 10B becomes the angle θ3, the controller 100B once stops an output of torque from the motors M1 and M2 of the first and second driving devices 50 and 60 or the rotation of the first shaping die 10B. Then, the controller 100B controls the motors M1 and M2 of the first and second driving devices 50 and 60 so that the first and second shaping dies 10B and 20B are integrally rotated about the rotational axis RA in the counterclockwise direction in the figure by a predetermined angle θ4 therefrom. In the conductor shaping apparatus 1B, the rotational direction of the first and second shaping dies 10B and 20B that are integrally rotated is contrary to the rotational direction of the first shaping die 10B with respect to the second shaping die 20B when shaping the bus bar portion BB. Further, the controller 100B controls the motors M1 and M2 of the first and second driving devices 50 and 60 so as to rotate the first and second shaping dies 10B and 20B about the rotational axis RA at a same rotational speed.

Figure 14:
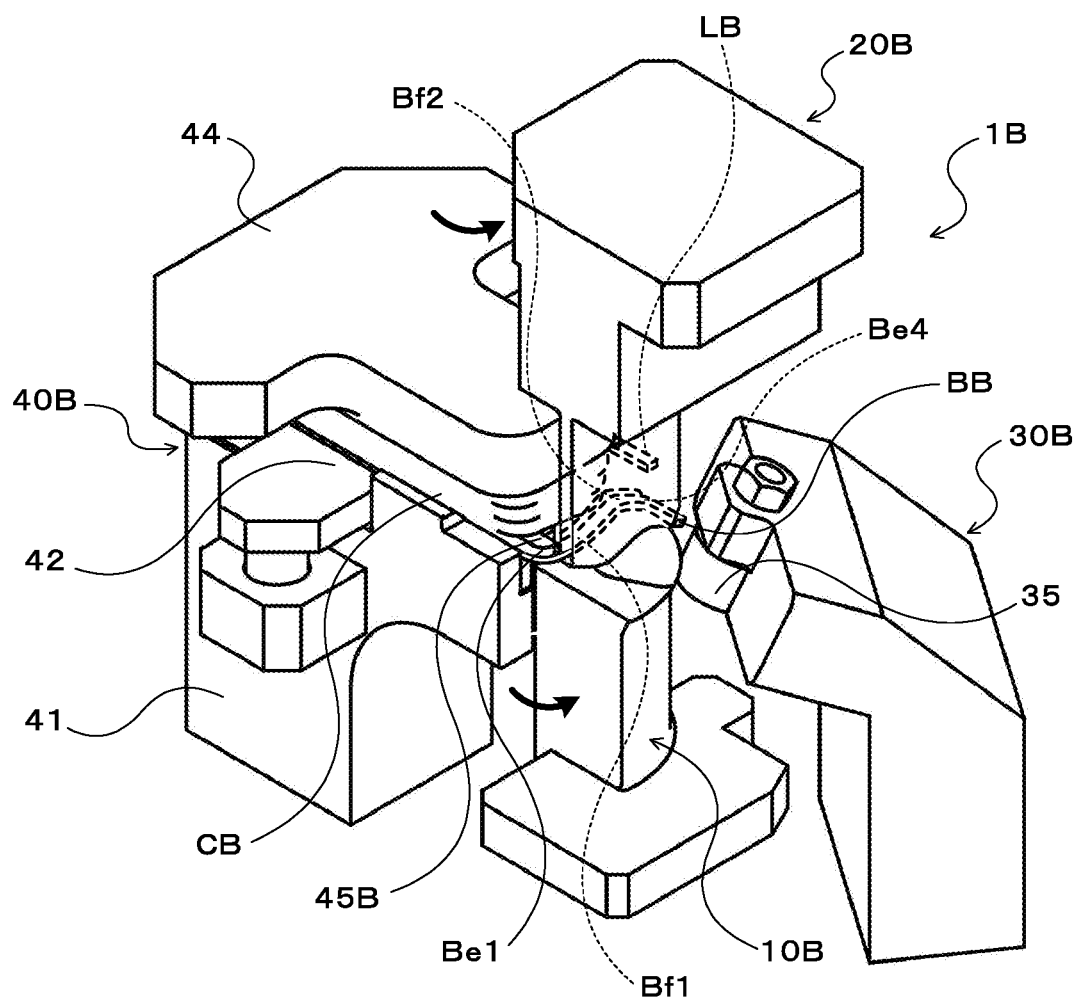
FIG. 14 is a perspective view illustrating the operation of another conductor shaping apparatus according to the disclosure.

When the first and second shaping dies 10B and 20B are integrally rotated, a portion of the bus bar portion BB between the portion (proximal end) of the bus bar portion BB restrained by the proximal end shaping portion 45B of the coil holding section 40B and the portion of the bus bar portion BB clamped between the first and second shaping dies 10B and 20B (the stepped portion 14B of the first shaping die 10B and the stepped portion of the second shaping die 20B) is pressed against the edgewise shaping surface of the proximal end shaping portion 45B so as to be bent in the edgewise direction. As a result, as shown in FIG. 14, the edgewise bent portion Be1 in the most proximal end side is formed in the bus bar portion BB by integrally rotating the first and second shaping dies 10B and 20B about the rotational axis RA by the angle θ4. On this occasion, the bus bar portion BB is tightly clamped between the first and second shaping dies 10B and 20B that are rotated about the rotational axis RA at the same rotational speed, so that the edgewise bent portion Be1 in the most proximal end side is accurately formed in the bus bar portion BB.

Further, when the first and second shaping dies 10B and 20B are integrally rotated, the inner side surface (right side surface in FIG. 13) of the distal end portion of the bus bar portion BB that protrudes outward via the clearance between the first and second shaping dies 10B and 20B contacts with the shaping roller 35 of the distal end shaping portion 30B on a downstream side of the stop position of the first shaping die 10B (where the first and second shaping dies 10B and 20B start rotating integrally) in the rotational direction of the first and second shaping dies 10B and 20B. In response to the rotation of the first and second shaping dies 10B and 20B, the shaping roller 35 rolls on the inner side surface of the distal end portion of the bus bar portion BB that is rotated while being held by the first and second shaping dies 10B and 20B (the stepped portion 14B of the first shaping die 10B and the stepped portion of the second shaping die 20B). The distal end portion of the bus bar portion BB is pressed by the shaping roller 35 to be bent in a direction opposite to the rotational direction of the first and second shaping dies 10B and 20B. That is, the distal end portion of the bus bar portion BB is bent in the edgewise direction so as to extend in a direction opposite to an extending direction of the edgewise bent portion Be1 in the most proximal end side.

As a result, as shown in FIG. 14, the edgewise bent portion Be4 in the most distal end side is formed in the bus bar portion BB by integrally rotating the first and second shaping dies 10B and 20B about the rotational axis RA by the angle θ4. On this occasion, the bus bar portion BB is tightly clamped between the first and second shaping dies 10B and 20B that are rotated about the rotational axis RA at the same rotational speed, so that the edgewise bent portion Be4 in the most distal end side is accurately formed in the bus bar portion BB. Further, the shaping roller 35 forms the edgewise bent portion Be4 while rolling on the inner side surface of the distal end portion of the bus bar portion BB, thereby reducing small scratches on the bus bar portion BB. The angle θ4 for integrally rotating the first and second shaping dies 10B and 20B is defined in consideration of bent angles of the edgewise bent portions Be1 and Be4 and springback of the bus bar portion BB (rectangular wire).

Figure 15:
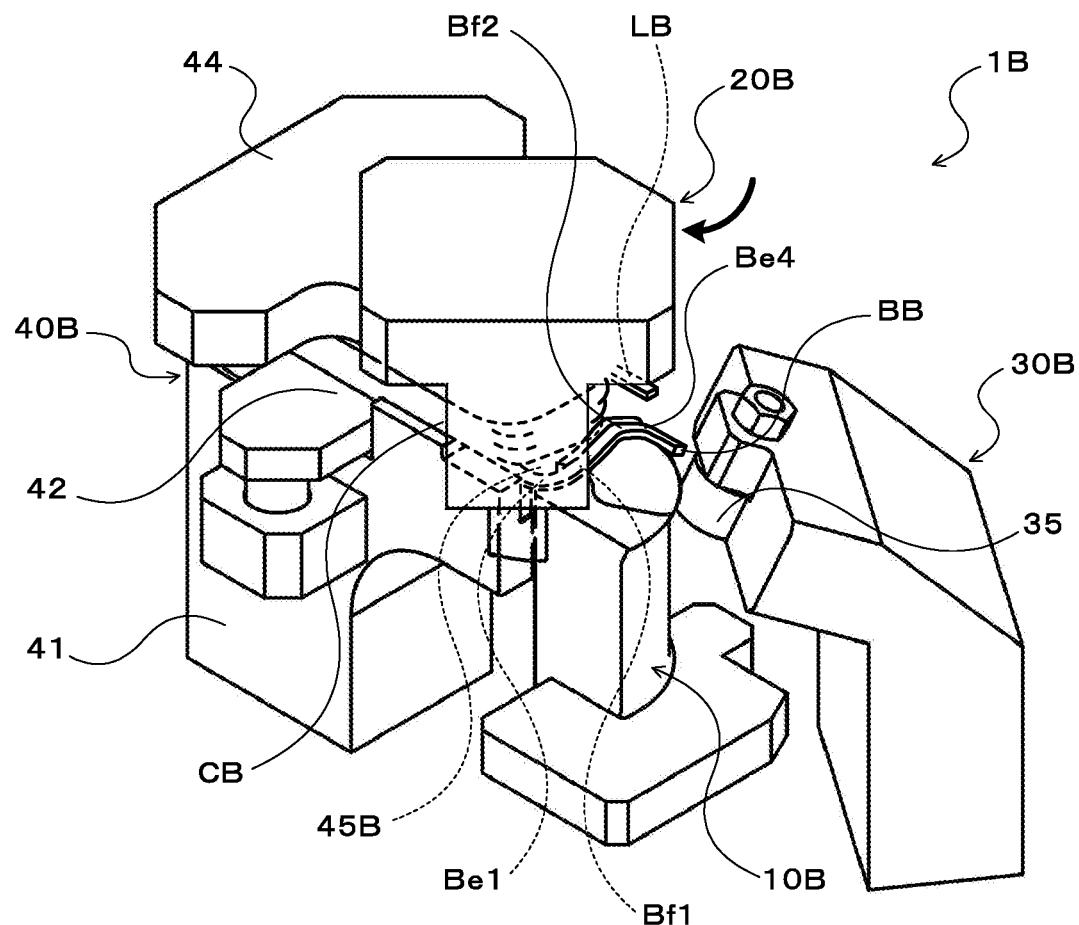
FIG. 15 is a perspective view illustrating the operation of another conductor shaping apparatus according to the disclosure.
Figure 16:
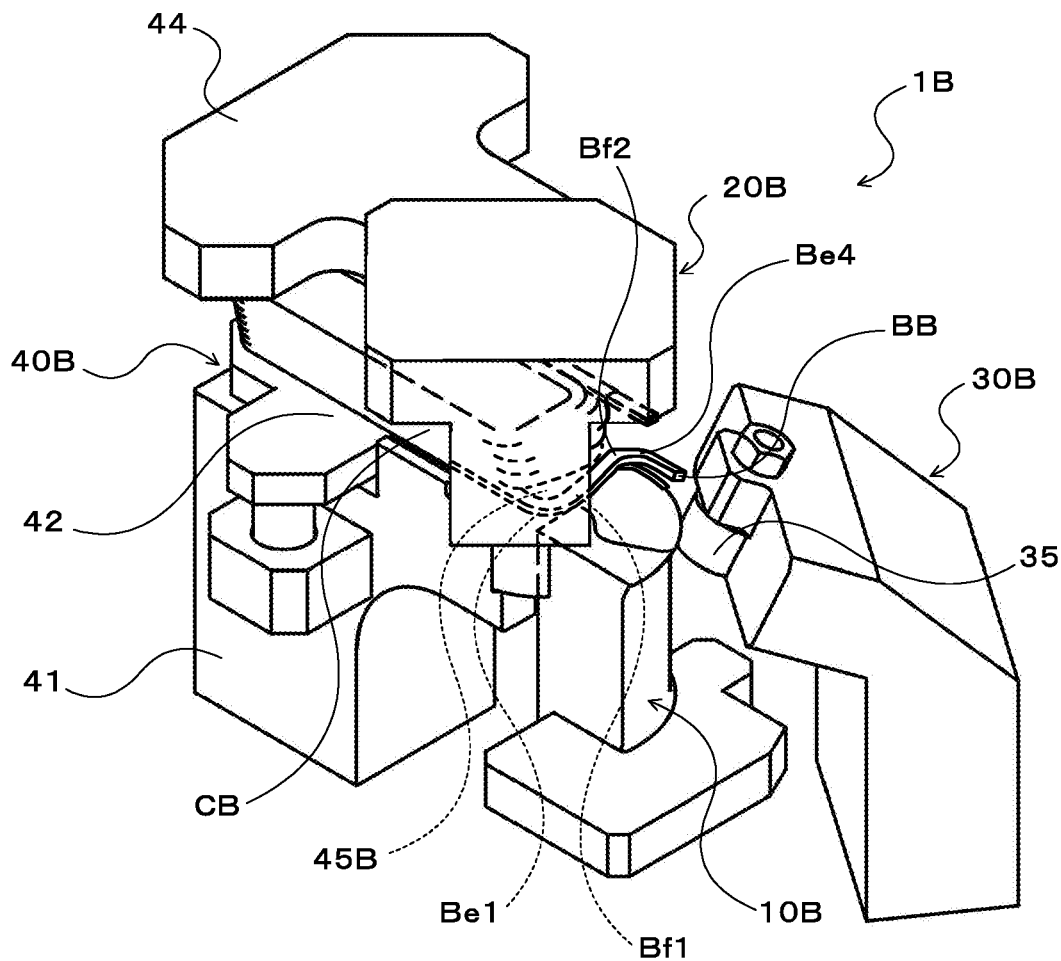
FIG. 16 is a perspective view illustrating the operation of another conductor shaping apparatus according to the disclosure.

When the rotational angle of the first and second shaping dies 10B and 20B becomes the angle θ4 and the edgewise bent portions Be1 and Be4 are formed completely, the controller 100B stops the motors M1 and M2 of the first and second driving devices 50 and 60 so as to stop the rotation of the first and second shaping dies 10B and 20B. Then, the controller 100B controls the motor M2 of the second driving device 60 so that the second shaping die 20B is rotated about the rotational axis RA and returns to the initial position. On this occasion, the controller 100B controls the motor M2 of the second driving device 60 so that the drive shaft S2 is rotated at a predetermined rotational speed (rotational speed control). When the second shaping die 20B returns to the initial position, as shown in FIG. 15, the controller 100B controls the driving mechanism of the coil holding section 40B so as to raise the coil placing table 42 and the coil pressing plate 44 to respective initial positions shown in FIG. 9. Thus, as shown in FIG. 16, the coil pressing plate 44 is separated from the coil CB and the coil CB is raised together with the coil placing table 42. Then, the coil CB with the shaped bus bar portion BB is transferred to the coil conveyor (not shown). After that, the plurality of edgewise bent portions Be1, Be4 and the plurality of flatwise bent portions Bf1, Bf2 are formed in the bus bar portion BB by the conductor shaping apparatus 1B when the coil CB with the unshaped bus bar portion BB is placed on the coil placing table 42.

As has been described above, the conductor shaping apparatus 1B rotates the first shaping die 10B about the rotational axis RA with respect to the second shaping die 20B, so that the flatwise bent portions Bf1 and Bf2 are formed in the bus bar portion BB of the coil CB held by the coil holding section 40B. On this occasion, the second driving device 60 applies the rotational torque (driving force) to the second shaping die 20B and the first driving device 50 applies the rotational torque (driving force) to the first shaping die 10B so that the bus bar portion BB is tightly clamped between the first and second shaping dies 10B and 20B, thereby enabling the flatwise bent portions Bf1 and Bf2 to be accurately formed in the bus bar portion BB. In the conductor shaping apparatus 1B, the first and second shaping dies 10B and 20B may be configured to format least one edgewise bent portion in the bus bar portion BB in addition to the flatwise bent portions Bf1 and Bf2.

Furthermore, in the conductor shaping apparatus 1B capable of integrally rotating the first and second shaping dies 10B and 20B about the rotational axis, the rotational direction of the first and second shaping dies 10B and 20B that are integrally rotated can be set in accordance with orientations of the edgewise bent portions to be formed in the bus bar portion BB, thereby improving the flexibility of setting the orientations of the edgewise bent portions. That is, the conductor shaping apparatus 1B is capable of bending the edgewise bent portions Be1 and Be4 in opposite directions to those formed by the conductor shaping apparatus 1 in which the rotational direction of the second shaping dies 20 with respect to the first shaping die 10 is the same as the rotational direction of the first and second shaping dies 10 and 20 that are integrally rotated, thereby enabling the edgewise bent portions Be1 and Be4 to be formed in the bus bar portion BB, that are not formed by the conductor shaping apparatus 1 even though shapes of the first and second shaping dies 10 and 20 are changed. As a result, the conductor shaping apparatus 1B improves the accuracy and the flexibility of shaping the bus bar portion BB with the plurality of bent portions Be1, Be4, Bf1 and Bf2.

The conductor shaping apparatus 1B includes the proximal end shaping portion 45B configured to contact with the bus bar portion BB so as to form the edgewise bent portion Be1 in the most proximal end side when the first and second shaping dies 10B and 20B are integrally rotated about the rotational axis RA and the distal end shaping portion 30B configured to contact with the distal end portion of the bus bar portion BB so as to form the edgewise bent portion Be4 when the first and second shaping dies 10B and 20B are integrally rotated about the rotational axis RA. That is, the edgewise bent portion Be1 in the most proximal end side and the edgewise bent portion Be4 in the most distal end side are accurately formed in the bus bar portion BB by the proximal end shaping portion 45B with a simple structure and the distal end shaping portion 30B with a simple structure without using shaping sections including a movable section such as a cam mechanism or a dedicated driving device when integrally rotating the first and second shaping dies 10B and 20B about the rotational axis RA.

In the conductor shaping apparatus 1B, the controller 100B controls the motor M2 of the second driving device 60 so as to generate the torque for stopping the second shaping die 20B at the above stop position when rotating the first shaping die 10B with respect to the second shaping die 20B. This configuration enables the bus bar portion BB to be tightly clamped between the first and second shaping dies 10B and 20B when forming the bent portions Bf1 and Bf2 in the bus bar portion BB while rotating the first shaping die 10B with respect to the second shaping die 20B, thereby accurately forming the flatwise bent portions Bf1 and Bf2 in the bus bar portion BB.

In the conductor shaping apparatus 1B, the controller 100B controls the motors M1 and M2 of the first and second driving devices 50 and 60 so as to rotate the first and second shaping dies 10B and 20B about the rotational axis RA at the same rotational speed when the first and second shaping dies 10B and 20B are integrally rotated about the rotational axis RA. This configuration enables the bus bar portion BB to be tightly clamped between the first and second shaping dies 10B and 20B when forming the edgewise bent portions Be1 and Be4 in the bus bar portion BB while integrally rotating the first and second shaping dies 10B and 20B, thereby accurately forming the edgewise bent portions Be1 and Be4 in the bus bar portion BB.

In the conductor shaping apparatus 1B, the controller 100B may be configured to control the motors M1 and M2 of the first and second driving devices 50 and 60 so as to make the torque applied to the second shaping die 20B on the rear side in the rotational direction become equal to or larger than the torque applied to the first shaping die 10B on the front side in the rotational direction when the first and second shaping dies 10B and 20B are integrally rotated about the rotational axis RA. In this configuration, the bus bar portion BB is tightly clamped between the first and second shaping dies 10B and 20B when forming the edgewise bent portions Be1 and Be4 in the bus bar portion BB while integrally rotating the first and second shaping dies 10B and 20B, so that the edgewise bent portions Be1 and Be4 are accurately formed in the bus bar portion BB.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The techniques according to the disclosure is applicable to, for example, the field of manufacture of the conductor with the bent portion.

The invention claimed is:

1. A conductor shaping apparatus configured to rotate one of a first shaping die and a second shaping die about a rotational axis with respect to the other of the first and second shaping dies so as to form at least one bent portion in a conductor, the conductor shaping apparatus comprising:
a holding section configured to hold the conductor;
a first drive source configured to apply driving force to the first shaping die and to rotate the first shaping die about the rotational axis;
a second drive source configured to apply driving force to the second shaping die and to rotate the second shaping die about the rotational axis;
a distal end shaping portion configured to contact with a distal end portion of the conductor so as to form the bent portion when the first and second shaping dies are integrally rotated about the rotational axis, wherein the distal end shaping portion is configured to contact with the distal end portion of the conductor in a downstream side of a position where the first and second shaping dies start rotating integrally in a rotational direction of the first and second shaping dies; and
a controller programmed to control the first and second drive sources so as to rotate one of the first and second shaping dies about the rotational axis with respect to the other of the first and second shaping dies, the controller programmed to control the first and second drive sources so as to integrally rotate the first and second shaping dies about the rotational axis.

2. The conductor shaping apparatus according to claim 1, wherein the holding section includes a proximal end shaping portion configured to contact with the conductor so as to form the bent portion in a most proximal end side when the first and second shaping dies are integrally rotated about the rotational axis.

3. The conductor shaping apparatus according to claim 1, wherein a rotational direction of the one of the first and second shaping dies with respect to the other of the first and second shaping dies is the same as a rotational direction of the first and second shaping dies that are integrally rotated.

4. The conductor shaping apparatus according to claim 1, wherein a rotational direction of the one of the first and second shaping dies with respect to the other of the first and second shaping dies is contrary to a rotational direction of the first and second shaping dies that are integrally rotated.

5. The conductor shaping apparatus according to claim 1, wherein the controller is configured to control one of the first and second drive sources so as to generate a torque for stopping the one of the first and second shaping dies when controlling the other of the first and second drive sources so as to rotate the other of the first and second shaping dies with respect to the one of the first and second shaping dies.

6. The conductor shaping apparatus according to claim 1, wherein the controller is configured to control the first and second drive sources so as to rotate the first and second shaping dies about the rotational axis at a same rotational speed when the first and second shaping dies are integrally rotated about the rotational axis.

7. The conductor shaping apparatus according to claim 1, wherein the controller is configured to control the first and second drive sources so as to make a torque applied to one of the first and second shaping dies become equal to or larger than a torque applied to the other of the first and second shaping dies when the first and second shaping dies are integrally rotated about the rotational axis in a state where the one of the first and second shaping dies is positioned on a rear side in a rotational direction and the other of the first and second shaping dies is positioned on a front side in the rotational direction.

8. The conductor shaping apparatus according to claim 1, wherein the conductor is a rectangular wire,
wherein the bent portion includes an edgewise bent portion and a flatwise bent portion, wherein at least one of the edgewise bent portion and the flatwise bent portion is formed in the conductor by rotating the one of the first and second shaping dies with respect to the other of the first and second shaping dies, and wherein at least one edgewise bent portion is formed in the conductor by integrally rotating the first and second shaping dies about the rotational axis.

9. The conductor shaping apparatus according to claim 1, wherein the conductor is a bus bar portion that extends from one end of a coil, and wherein the holding section is configured to hold the coil.

10. A conductor shaping apparatus configured to rotate one of a first shaping die and a second shaping die about a rotational axis with respect to the other of the first and second shaping dies so as to form at least one bent portion in a conductor, the conductor shaping apparatus comprising:

a holding section configured to hold the conductor;

a first drive source configured to apply driving force to the first shaping die and to rotate the first shaping die about the rotational axis;

a second drive source configured to apply driving force to the second shaping die and to rotate the second shaping die about the rotational axis; and a controller programmed to control the first and second drive sources so as to rotate one of the first and second shaping dies about the rotational axis with respect to the other of the first and second shaping dies, the controller programmed to control the first and second drive sources so as to integrally rotate the first and second shaping dies about the rotational axis, wherein the controller is configured to control the first and second drive sources so as to make a torque applied to one of the first and second shaping dies become equal to or larger than a torque applied to the other of the first and second shaping dies when the first and second shaping dies are integrally rotated about the rotational axis in a state where the one of the first and second shaping dies is positioned on a rear side in a rotational direction and the other of the first and second shaping dies is positioned on a front side in the rotational direction.

11. A conductor shaping apparatus configured to rotate one of a first shaping die and a second shaping die about a rotational axis with respect to the other of the first and second shaping dies so as to foal" at least one bent portion in a conductor, the conductor shaping apparatus comprising:

a holding section configured to hold the conductor;

a first drive source configured to apply driving force to the first shaping die and to rotate the first shaping die about the rotational axis;

a second drive source configured to apply driving force to the second shaping die and to rotate the second shaping die about the rotational axis; and a controller programmed to control the first and second drive sources so as to rotate one of the first and second shaping dies about the rotational axis with respect to the other of the first and second shaping dies, the controller programmed to control the first and second drive sources so as to integrally rotate the first and second shaping dies about the rotational axis, wherein the conductor is a rectangular wire, wherein the bent portion includes an edgewise bent portion and a flatwise bent portion, wherein at least one of the edgewise bent portion and the flatwise bent portion is formed in the conductor by rotating the one of the first and second shaping dies with respect to the other of the first and second shaping dies, and wherein at least one edgewise bent portion is formed in the conductor by integrally rotating the first and second shaping dies about the rotational axis.

12. A conductor shaping method of forming a plurality of bent portions in a conductor that is held by a holding section with a first shaping die and a second shaping die, the method comprising:

holding the conductor with the holding section;

controlling a first drive source and a second drive source, the first drive source applying a driving force to the first shaping die and to rotate the first shaping die about a rotational axis, the second drive source applying a driving force to the second shaping die and to rotate the second shaping die about the rotational axis, the controlling includes controlling the first and second drive sources so as to rotate one of the first and second shaping dies about the rotational axis with respect to the other of the first and second shaping dies, and controlling the first and second drive sources so as to integrally rotate the first and second shaping dies about the rotational axis; and contacting a distal end shaping portion with a distal end portion of the conductor so as to form the bent portion when the first and second shaping dies are integrally rotated about the rotational axis, wherein the distal end shaping portion contacts he distal end portion of the conductor in a downstream side of a position where the first and second shaping dies start rotating integrally in a rotational direction of the first and second shaping dies.

\* \* \* \* \*